(12) United States Patent
Luguev et al.

(10) Patent No.: US 12,169,850 B1
(45) Date of Patent: Dec. 17, 2024

(54) ENHANCING CONTENT AND LAYOUT CONTROL WITH GENERATIVE SYSTEMS

(71) Applicant: Ecomtent Inc., Toronto (CA)

(72) Inventors: Timur Luguev, Toronto (CA); Zakaria Patel, Hamilton (CA); Hantang Li, Toronto (CA); Max Sinclair, Toronto (CA)

(73) Assignee: ECOMTENT INC., Toronto (CA)

( * ) Notice: Subject to any disclaimer, the term of this patent is extended or adjusted under 35 U.S.C. 154(b) by 0 days.

(21) Appl. No.: 18/613,518

(22) Filed: Mar. 22, 2024

(51) Int. Cl.
  *G06Q 30/02* (2023.01)
  *G06Q 30/0204* (2023.01)
  *G06Q 30/0242* (2023.01)
  *G06Q 30/0251* (2023.01)

(52) U.S. Cl.
  CPC ..... *G06Q 30/0253* (2013.01); *G06Q 30/0204* (2013.01); *G06Q 30/0246* (2013.01)

(58) Field of Classification Search
  CPC ........... G06Q 30/0253; G06Q 30/0204; G06Q 30/0246
  See application file for complete search history.

(56) References Cited

U.S. PATENT DOCUMENTS

| | | | | |
|---|---|---|---|---|
| 2023/0259692 A1* | 8/2023 | Wright | ............... | G06F 40/56 704/9 |
| 2024/0161258 A1* | 5/2024 | Maschmeyer | ............ | G06T 7/70 |
| 2024/0193913 A1* | 6/2024 | Saraee | ............... | G06V 10/40 |
| 2024/0312087 A1* | 9/2024 | Agrawal | ............... | G06F 40/40 |

OTHER PUBLICATIONS

"Training-Free Layout Control with Cross-Attention Guidance" (Chen, Minghao et al., 2024 IEEE/CVF Winter Conference on Applications of Computer Vision (WACV), Jan. 3 through Jan. 8, 2024; vol. 1, pp. 5331-5341) (Year: 2024).*
"Generate e-commerce product background by integrating category commonality and personalized style" (Wang, Haohan et al., Published Dec. 20, 2023 in Computer Vision and Pattern Recognition, https://doi.org/10.48550/arXiv.2312.13309) (Year: 2023).*

* cited by examiner

*Primary Examiner* — James M Detweiler
(74) *Attorney, Agent, or Firm* — Dickinson Wright LLP; Yuri Chumak

(57) ABSTRACT

A system and method for enhancing e-commerce product listings is disclosed, performed on a server. The method involves importing listing data through Application Programming Interface (API) connections and analyzing this data to calculate a multimodal vector embedding. A quality score is estimated based on the embedding and real-time market data metrics. The method generates content elements, including product images, textual descriptions, and infographics, by applying a controlled generation algorithm through a text-to-image diffusion model. This model integrates loss-guidance and attention injection mechanisms to produce a controlled layout of the product images, producing content that is visually appealing and market-relevant. The resulting content elements are stored in the server's data storage, ready for e-commerce display.

13 Claims, 17 Drawing Sheets

| Search listings... | Besta | ∨ | Select Category ∨ | Select all Discount ∨ | ⌄ Filters |
|---|---|---|---|---|---|

Listings [254] ← 912

914 — ⊕ Apply all Optimizations

| | Products | ⇔Category | ⇔#Images | ⇔Price | ⇔Optimization Score | ⇔Recommended Action |
|---|---|---|---|---|---|---|
| ☐ | Functional Home Dresser | Furniture | 1 | $345.00 | ★1.8  916a | Add Infographic |
| ☐ | Cotton Collar T-shirts for Men | Fashion | 6 | $180.00 | ★2.0  916b | Add Keywords |
| ☐ | Super Bass Wireless Headphones | Headphones | 1 | $180.00 | ★2.1  916c | Update Description |
| ☐ | Full Sleeve Men Sweatshirt | Fashion | 5 | $260.00 | ★2.1  916d | Add Images |
| ☐ | Flip-Flops and House Slippers | Footwear | 4 | $150.00 | ★2.2  916e | Add Images |
| ☐ | Fossil Gen 5E Smart Watch | Watches | 1 | $120.00 | ★2.3  916f | Add Infographic |
| ☐ | Like Style Travel Black Handbag | Luggage | 3 | $160.00 | ★2.5  916g | Update Description |
| ☐ | Olive Printed Mens Round Neck | Fashion | 2 | $250.00 | ★3.8  916h | Add Infographic |
| ☐ | Jeans Blue Men Boxer | Fashion | 6 | $97.99 | ★3.9  916i | Add Infographic |

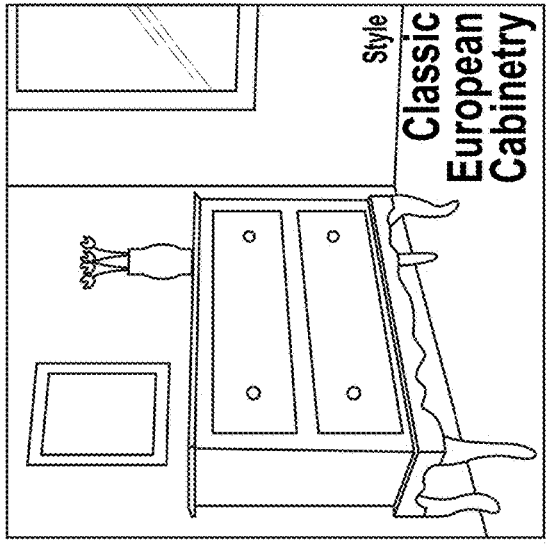
FIG. 13A
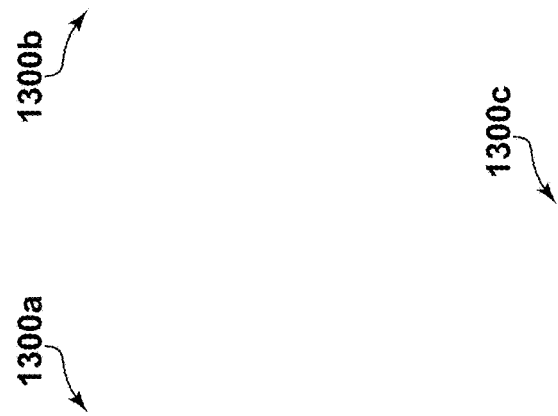
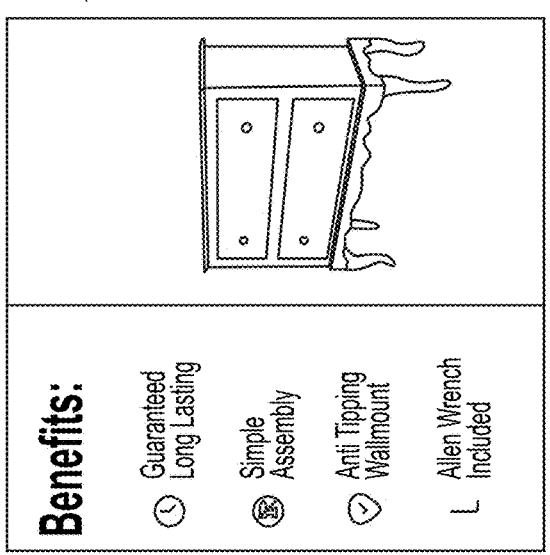
FIG. 13B
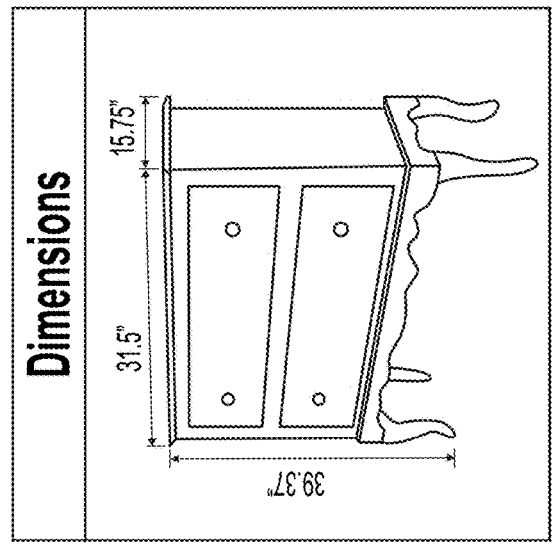
FIG. 13C

ENHANCING CONTENT AND LAYOUT CONTROL WITH GENERATIVE SYSTEMS

FIELD OF THE INVENTION

The field of the invention is artificial intelligence and machine learning algorithms and, in particular, methods and systems for generating, organizing, and optimizing digital content.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

In the realm of e-commerce, product listings serve as a link between merchants and customers, playing a role in influencing purchasing decisions. The quality, variety, and freshness of content in these listings directly impact consumer engagement, conversion rates, and ultimately, the success of online retail platforms.

Traditional methods for content creation and layout control often require manually intensive input, leading to processes that are both time-consuming and prone to human error. Translating these efforts into higher conversion rates often demands that the material be crafted by experts in photography, graphic design, copywriting, and more, which incurs a substantial time commitment and costs. Generally, conventional techniques lack the ability to produce a wide variety of content in a time- and cost-effective manner, limiting the diversity and appeal of the output. As businesses and digital platforms evolve, the demand for fresh, engaging, and diverse content has increased significantly, highlighting the limitations of these traditional methods.

The recent surge in generative artificial intelligence (AI) has shed light on powerful new use-cases across many different industries. In this regard, generative systems have been explored as a solution to assist with content creation in e-commerce applications. However, current approaches have drawbacks, especially when they require manual input, are built on static datasets, and fail to incorporate real-time information, leading to content that becomes outdated quickly. This stale content fails to perform well in terms of user engagement, conversion rates, and search engine rankings. Content consumption trends and search engine algorithms are increasingly tuned to promote fresh, relevant, and dynamically updated content, further exacerbating the challenges faced by conventional approaches.

The need for improved methods and systems for generating, organizing, and optimizing digital content is clear. There is a motivation to not only automate the creation and organization of content but also to ensure the content remains fresh and relevant to maintain high engagement and visibility in a changing digital landscape.

Thus, there is a need for systems and methods that allow for enhancing content and layout control with generative systems and to mitigate some of the obstacles related to manual input, content variety limitations, and obsolescence in digital content management, among others. There is also a need to provide alternatives to existing systems and methods.

BRIEF DESCRIPTION OF DRAWINGS

Various objects, features, aspects, and advantages of the inventive subject matter will become more apparent from the following detailed description of preferred embodiments, along with the accompanying drawing figures in which like numerals represent like components.

FIG. 8A, FIG. 8B and FIG. 9 are screenshots showing various user interfaces for managing and optimizing e-commerce listings.

FIG. 10 and FIG. 11 are before and after comparisons of an exemplary product listing.

FIG. 12 and FIG. 13A to FIG. 13C are before and after comparisons of an exemplary product image.

DETAILED DESCRIPTION OF THE INVENTION

Figure 1:
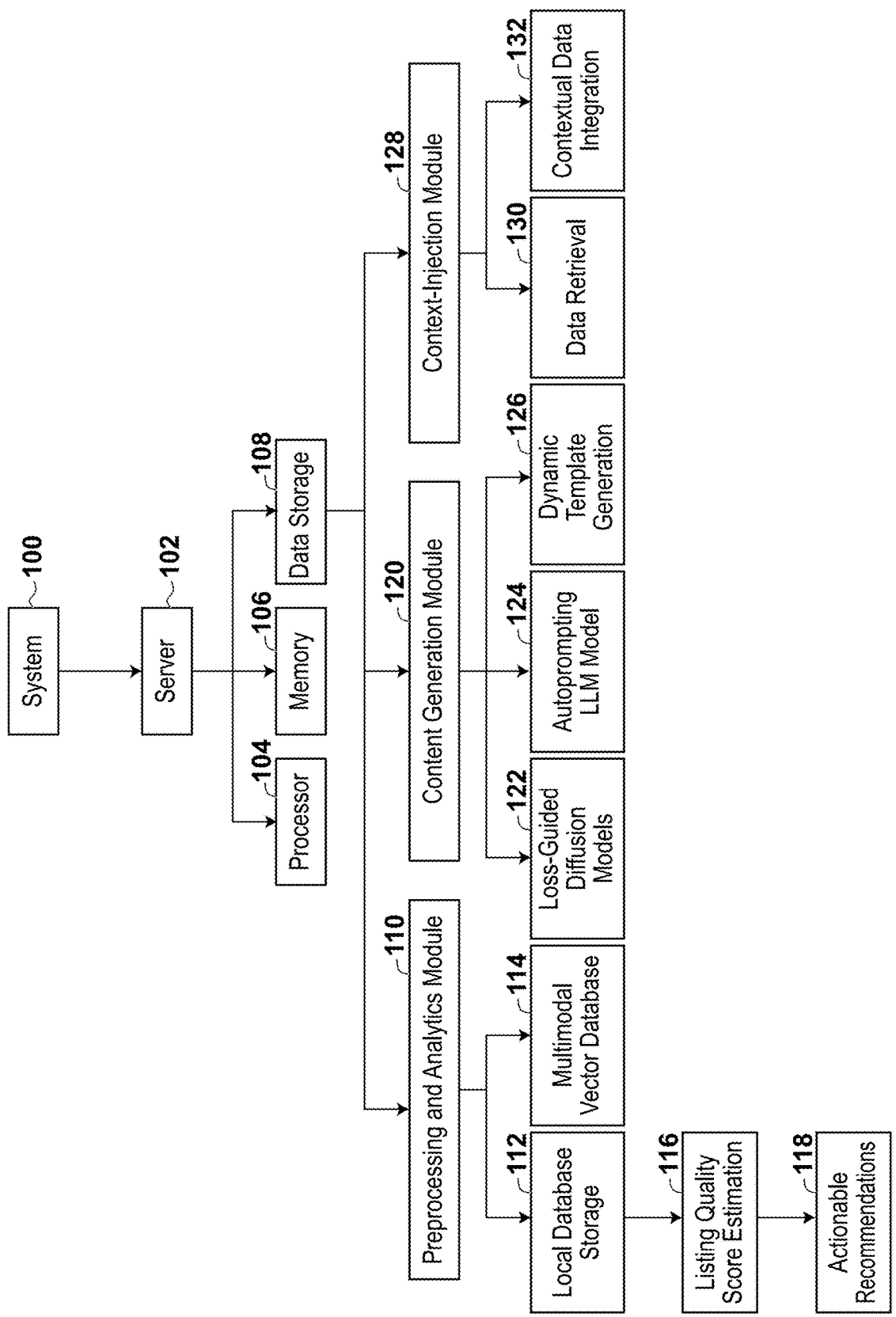
FIG. 1 is a block diagram of an exemplary system architecture for enhancing content and layout control using generative systems, in accordance with an example of the present specification.

This detailed description provides an explanation of the embodiments of the present specification. The present specification encompasses a variety of systems, methods, and non-transitory computer-readable media.

The present specification includes one or more claims directed to methods and systems for enhancing content and layout control, including in e-commerce product listings. As described herein, the method is performed on a server equipped with a processor, memory, data storage, and a network interface device. The method includes importing listing data via Application Programming Interface (API) connections, analyzing this data to compute a multimodal vector embedding, and estimating a quality score based on the embedding and real-time market data metrics. The method further encompasses the generation of content elements for e-commerce display, including product images, textual descriptions, and infographics. This generation process uses a controlled generation algorithm including a text-to-image diffusion model, designed to integrate loss-guidance and attention injection to achieve a controlled layout of the product images. The content elements are subsequently stored in the data storage of the server. This detailed description and the accompanying drawings provide sufficient information to enable one of ordinary skill in the art to practice the claimed invention, and the described embodiments illustrate the application of the principles of the claimed methods and systems.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of features used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed considering the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One embodiment of the disclosed methods and systems pertains to automated content generation in e-commerce, using artificial intelligence algorithms to optimize product listings. Executed on a server equipped with a processor, memory, data storage, and network connectivity, this method enhances the presentation and effectiveness of e-commerce product displays. According to this embodiment, the process begins by importing listing data via Application Programming Interface (API) connections. This data includes product information such as titles, descriptions, and original images. The system analyzes this data to compute a multimodal vector embedding, forming the basis for subsequent content generation steps. A quality score is estimated using the multimodal vector embedding and real-time market data metrics. This score reflects the potential market performance of the product listing, considering factors like market demand, competitor pricing, and consumer behavior trends. Content generation involves the creation of product images, textual descriptions, and infographics. This process employs a controlled generation algorithm, in one example, a text-to-image diffusion model, which is fine-tuned with data from best-performing prompts across various product categories. The model incorporates loss-guidance and attention injection to achieve a controlled layout, enhancing the visual appeal and clarity of the product images. The system dynamically updates the multimodal vector embedding and quality score based on user feedback, such as click-through rates, time spent on the listing page, and purchase conversion rates. A/B testing is conducted to determine the most effective content version, which is then stored for display. An automatically prompting Large Language Model (LLM) generates optimal prompts for the diffusion model, considering product category and target demographics. Infographics are created by overlaying or placing textual descriptions alongside product images, providing a view of the product's features and benefits. Text size, position, and formatting are dynamically adjusted to enhance readability and user convenience. The system also presents actionable recommendations for content optimization, based on an analysis of quality scores, market data metrics, and user engagement feedback.

The system architecture supports these functionalities, with a processor executing instructions stored in memory to perform the method. Additionally, a non-transitory computer-readable storage medium contains instructions for executing the content generation process, in a variety of e-commerce platforms and environments. A computer system may include one or more processors, memory, and storage devices configured with software and/or firmware to implement the specified functionalities.

Generative models refer to algorithms that learn an underlying data distribution, enabling the generation of new, synthetic data. These models vary in type, each with unique characteristics. For instance, autoregressive models, which sequentially predict pixel distributions based on preceding pixels, are useful in capturing complex variable relationships but are resource-intensive in training and sampling. Generative Adversarial Networks (GANs) use adversarial training to produce high-quality samples yet are susceptible to training difficulties and mode collapse, where the model limits its output diversity. Variational Autoencoders (VAEs) offer simpler training processes but often result in less sharp images. Flow models, while efficient in sampling, typically generate lower-quality samples. Notably, diffusion models have gained prominence for their ability to produce diverse, high-quality images with good mode coverage, achieved through training on extensive datasets. They enable image generation from textual prompts, though they lack precise control over the final image's composition and layout, depending largely on the initial noise sample for structure.

In the realm of controllable generation using diffusion models, various methods have been explored. Meng et al. suggest initializing the reverse Stochastic Differential Equation (SDE) with paint strokes noised to a specific threshold; this method's final image realism heavily depends on the initial noise level (C. Meng, Y. He, Y. Song, J. Song, J. Wu, J.-Y. Zhu, and S. Ermon. Sdedit: Guided image synthesis and editing with stochastic differential equations, 2022). Zhang et al. employ a different approach, conditioning on features from a dedicated encoder network, which processes a control image like a sketch or depth map to guide image generation (L. Zhang, A. Rao, and M. Agrawala. Adding conditional control to text-to-image diffusion models, 2023). Zheng et al. developed trainable modules to incorporate layout information for generating images based on specified layouts (G. Zheng, X. Zhou, X. Li, Z. Qi, Y. Shan, and X. Li. Layout diffusion: Controllable diffusion model for layout-to-image generation, 2023). However, these techniques require significant adjustments, such as finetuning a large pretrained encoder or training new modules.

An emerging strategy involves using cross-attention mechanisms for training-free layout control. Hertz et al. showed that attention maps could be transferred and adjusted between different diffusion processes to influence specific image aspects (A. Hertz, R. Mokady, J. Tenenbaum, K. Aberman, Y. Pritch, and D. Cohen-Or. Prompt-to-prompt image editing with cross attention control, 2022). Balaji et al. and Singh et al. further this concept by injecting values into attention maps for layout approximation and semantic control, respectively (Y. Balaji, S. Nah, X. Huang, A. Vahdat, J. Song, Q. Zhang, K. Kreis, M. Aittala, T. Aila, S. Laine, B. Catanzaro, T. Karras, and M.-Y. Liu. ediff-i: Text-to-image diffusion models with an ensemble of expert denoisers, 2023; J. Singh, S. Gould, and L. Zheng. High-fidelity guided image synthesis with latent diffusion models, 2022). Meanwhile, Chen et al. and Epstein et al. introduced methods for refining image layouts using attention maps and loss-guidance, respectively, although these require careful noise initialization (M. Chen, I. Laina, and A. Vedaldi. Training-free layout control with cross-attention guidance, 2023; D. Epstein, A. Jabri, B. Poole, A. A. Efros, and A. Holynski. Diffusion self-guidance for controllable image generation, 2023).

According to embodiments of the present specification, a combination of cross-attention injection with loss-guidance can be used to enhance layout control in the image generation process. In general, diffusion models function through two primary processes. In the forward process, data is gradually corrupted by the addition of Gaussian noise. The reverse process, on the other hand, iteratively reconstructs the original data from its noise-infused state, removing the noise at each step to revert the data back to its initial, uncorrupted form. The following paragraphs provide a mathematical foundation for diffusion models and controllable image generation.

The forward process is a Markov chain with Gaussian transitions in which samples are drawn iteratively with increasing levels of noise. Beginning with $x_0$, subsequent samples can be obtained from $p(x_t|x_{(t-1)})=N(x_{(t-1)}; \sqrt{1-\beta_t}x_t, \beta_t I)$ over T timesteps, resulting in a pure noise sample $X_T$. The joint distribution of these T samples is the Markov chain $p(X_{1:T}|X_0)=\Pi_{t=1}^{T} p(X_t|X_{t-1})$, which defines the forward process. Using the reparameterization trick, the transitions can be written in a functional form:

$$x_{(t-1)} = \sqrt{1-\beta_t}x_t + \sqrt{(\beta_t)}\varepsilon.$$

Given $\beta_t \ll 1$ and enough steps, $x_0$ can be slowly converted into pure noise. The sequence of $\beta_t$ is known as the variance schedule, or the diffusion rate, and can also be learned rather than fixed, the choice of which dictates whether or not the forward process contains trainable parameters.

Defining $\alpha t=1-\beta_t$, the forward process can be rewritten as $p(x_t|x_{(t-1)})=N(x_{t-1}; \sqrt{\alpha_t}x_t, (1-\alpha_t)I)$.

A useful property of the forward process can be obtained by again employing the reparameterization trick:

$$x_{t-2} = \sqrt{\alpha_{t-1}}\, x_{t-2} + \sqrt{1-\alpha_{t-2}}\,\varepsilon_{t-1} =$$
$$\sqrt{\alpha_{t-2}}\left(\sqrt{\alpha_{t-1}}\, x_{t-1} + \sqrt{1-\alpha_{t-1}}\,\varepsilon_t\right) + \sqrt{1-\alpha_{t-1}}\,\varepsilon_{t-1} = \sqrt{\alpha_{t-2}\alpha_{t-1}}\, x_t +$$
$$\sqrt{\alpha_{t-2} - \alpha_{t-2}\alpha_{t-1}}\,\varepsilon_t + \sqrt{1-\alpha_{t-1}}\,\varepsilon_{t-1} = \sqrt{\alpha_{t-2}\alpha_{t-1}}\, x_t + \sqrt{1-\alpha_{t-2}\alpha_{t-1}}\,,$$

where, in the last line, the fact is used that if $\varepsilon_t \sim N(0,\sigma_t)$ and $\varepsilon_{t-1} \sim N(0,\sigma_{t-1})$, then $\varepsilon_t+\varepsilon_{t-1} \sim N(0,\sigma_t+\sigma_{t-1})$. Then defining $\bar{\alpha}_t=\Pi_{i=1}^{t}\alpha_i$, $$x_t = \sqrt{\bar{\alpha}_t}\, x_0 + \sqrt{1-\bar{\alpha}_t}\,\varepsilon. \qquad (1)$$

This means that $x_t$ can now be sampled directly, without iterating through t steps of the Markov chain. Note that the variance schedule is chosen such that $\bar{\alpha}_t \approx 0$.

The forward process culminates with a sample from an isotropic Gaussian distribution. The reverse process is a Markov chain $p_\theta(x_{0:T})=p(X_T)\Pi_{t=1}^{T} p(x_{t-1}|x_t)$ that begins with $X_T \sim \mathcal{N}(0,I)$ where $p(x_{t-1}|x_t)$ is an unknown denoising distribution. Bayes' rule can be used to write $p(x_{t-1}|x_t) \propto p(x_{t-1})q(x_t|x_{t-1})$, but there is no access to the intractable marginal distribution $p(x_{t-1})$. Instead, each transition is again chosen to be Gaussian whose mean and variance are learnable:

$$p_\theta(x_{t-1}|x_t)= \mathcal{N}(x_{t-1};\mu_\theta(x_t,t),\Sigma_\theta(x_t,t)).$$

In practice, the variance is often fixed. The mean is parameterized by a neural network trained by optimizing the variational lower bound:

$$L := E_{q(x_0)q(x_{1:T}|x_0)}\left[-\log p_\theta(x_T) - \sum_{t \geq 1} \log \frac{p_\theta(x_{t-1}\mid x_t)}{q(x_t\mid x_{t-1})}\right]. \qquad (2)$$

As shown by Song et al. (Y. Song, J. Sohl-Dickstein, D. P. Kingma, A. Kumar, S. Ermon, and B. Poole. Score-based generative modeling through stochastic differential equations. arXiv preprint arXiv:2011.13456, 2020), both the forward and reverse diffusion processes can be modelled as solutions of stochastic differential equations (SDE). The SDE for the forward process is:

$$dx=f(x,t)dt+g(t)dw. \qquad (3)$$

According to Anderson (B. D. O. Anderson. Reverse-time diffusion equation models. Stochastic Processes and their Applications, 12:313-326, 1982), the reverse of equation (3) is another diffusion process which corresponds to solving the reverse-time SDE:

$$dx=[f(x,t)-g(t)^2 \nabla_x \log q_t(x)]dt+g(t)d\bar{w}. \qquad (4)$$

However, solving equation (4) requires the score of the marginal $q_t(x_t)$, which is intractable. Consequently, $\nabla_{x_t} \log q_t(x_t)$ can be learned through the following objective, according to Song et al.:

$$\theta^*=\arg_\theta \max \mathbb{E}_t\{\lambda(t)\, \mathbb{E}_{x_0}\mathbb{E}_{x_t|x_0}[\|s_\theta(x_t,t)-\nabla_{x_t} \log q_t(x_t|x_0)\|_2^2]\} \qquad (5)$$

While equation (5) not directly enforce learning the score of the $p_t(x_t)$, Song et al. propose conditioning on $x_0$ provides a tractable way to obtain a neural network $s_\theta(x, t)$ whose predicted score matches $\nabla_{x_t} \log p_t(x_t)$ almost everywhere. Because the forward process is available in closed form, the equation is:

$$\nabla_{x_t} \log q_t(x_t \mid x_0) = \nabla_{x_t} \log(\mathcal{N}(\mu_{tx_0}, \sigma_t^2 I)) = \nabla_{x_t}\left[\left(\frac{\mu_{tx_0} - x_t}{\sigma_t^2}\right) + C\right] = \quad (6)$$

$$\nabla_{x_t}\left[\frac{1}{2}\left(\frac{\mu_{tx_0} - \mu_{tx_0} - \sigma_{t\epsilon}}{\sigma_t^2}\right)^2 + C\right] \nabla_{x_t} \log q_t(x_t \mid x_0) = -\frac{\epsilon}{\sigma_t}$$

With forward process variances $\sigma_t^2 = 1 - \overline{\alpha}_t$, the neural network can be defined as:

$$s_\theta(x_t, t) := -\frac{\epsilon_\theta(x_t, t)}{\sqrt{1 - \overline{\alpha}_t}}. \quad (7)$$

To enable fast sampling, according to Song et al., there is a corresponding probability flow ODE with the same marginals as the SDE, which can be efficiently solved by a numerical ODE solver:

$$dx = \left[f(x, t) - \frac{1}{2}g(t)^2 \nabla_x \log p_t(x)\right] dt. \quad (8)$$

An exemplary aspect of the method described in this specification relies on the cross-attention mechanism. Cross attention was originally introduced for sequence modelling tasks in transformers (A. Vaswani, N. Shazeer, N. Parmar, J. Uszkoreit, L. Jones, A. N. Gomez, L. Kaiser, and I. Polosukhin. Attention is all you need, 2023). It enables the modelling of complex dependencies between two sequences $X = \{x_1, x_2, \ldots x_n\}$ and $Y = \{y_1, y_2, \ldots y_k\}$, whose elements are projected to query, key and value vectors using projection matrices:

$$XW_q = Q$$

$$YW_k = K$$

$$YW_v = V.$$

Subsequently, the attention weights are computed as:

$$A = \text{Softmax}\left(\frac{QK^T}{\sqrt{d_k}}\right). \quad (9)$$

And the new representation for the sequence X is:

$$Z = AV.$$

In diffusion models, the sequence X represents the image, where each $x_i$ represents a pixel, and Y is a sequence of token embeddings. The attention weights A, also called an attention map, follow the same spatial arrangement as the image, and a unique map is produced for each token in Y. Each entry $A_j$ describes how strongly related a spatial region X; is to a token $Y_j$. This feature of attention maps positions them as a useful medium for interpretability.

In diffusion models, cross attention is used for composition, layout and semantics. An attention map very early in the diffusion process is already suggestive of the final layout, so intervening early is relevant to achieve the desired result.

Turning to loss-guidance, conditional latent diffusion models predict the time-dependent conditional score $\nabla_{z_t} \log q_t(z_t|y)$ and the resulting latent is sampled from $z_0 \sim q_0(z_0|y)$. The conditional score at time t can be modified by introducing a loss term $l_y(x_t)$:

$$\nabla_{x_t} \log \hat{q}(x_t|y) = \nabla_{x_t} \log q(x_t|y) + \nabla_{x_t} l_y(x_t) \quad (10)$$

By modifying the score in this way, the trajectory of the reverse-time SDE can be influenced.

For layout control, the following simple loss function is selected:

$$l_y(x) = g_1(\overline{m} \odot A) - g_2(m \odot A) \quad (11)$$

where m is mask whose value is 1 over the masked region, and otherwise 0, and $\overline{m} = 1 - m$. Intuitively, this simple loss encourages sampling latents whose attention maps occur within the masked region defined by m. The specific choices of $g_i$ and $g_2$ heavily influence the behaviour of loss-guidance. The choice of $g_1 = \text{sum}(\bullet)$ contains the attention within the region defined by m. Similarly, the choice of $g_2 = \text{sum}(\bullet)$, or $92 = \text{max}(\bullet)$ can be used.

Revisiting equation (7), $s_{\theta*}(x_t, t)$ predicts the score of $q_t(x_t|x_0)$. In practice, diffusion models are trained to predict the total amount of noise $\epsilon$, so the modified noise prediction involves scaling the loss-guidance term ((Dhariwal et al.)):

$$\widehat{\epsilon_\theta}(x_t, t) = \epsilon_\theta(x_t, t) - \eta\sqrt{1 - \overline{\alpha}_t} \nabla_{x_t} l_y(x_t) \quad (12)$$

It is observed that the loss-guidance term often requires additional scaling, so a scaling constant $\eta$ can be introduced to control its strength.

A pathology of loss-guidance is that the rather ad-hoc choice of the loss function may not compete well with the predicted score $s_{\theta*}(x_t, t)$. Its empirical design means that the modified score only approximates the true score of the desired distribution at time t. Using high strength for loss-guidance means less reliance is placed on the trained model's predictions, and more on the empirical loss, which may result in out-of-distribution samples. On the contrary, small strengths may exert too little influence on the sampling trajectory. In this case, the model produces in-distribution samples, but they neglect the desired layout.

According to Hertz et al., attention injection extracts the attention maps from one diffusion process, which produces an image $x_0$, and enforce them in another, which produces $x_0'$. The two processes differ in select parts of their prompt token sequence. This produces the image $x_0'$ with the same composition as $x_0$, but a different style.

In this case, a valid attention map is available for each of the T timesteps from the first diffusion process. However, there is no guarantee that these attention maps produce the desired layout, and it is unfeasible to generate images until such a layout is obtained. Instead, there is the observation that the attention maps early in the diffusion process are strong indicators of generated image's composition. These maps are relatively diffuse, and don't suggest any structural details about objects within the image. Motivated by this, it has been discovered that attention maps can be manipulated by artificially enhancing the signal in certain regions of the map. The following scaling is used: $v_t = v' \cdot \log(1 + \sigma_t) \cdot \max(QK^T)$ (Balaji et al.)

A mask m, which is equal to 1 over the region which the text token should correspond to, and perform injection as follows:

$$A_t' = \text{softmax}\left(\frac{QK^T + v_t m}{\sqrt{d_k}}\right). \quad (14)$$

Figure 3A:
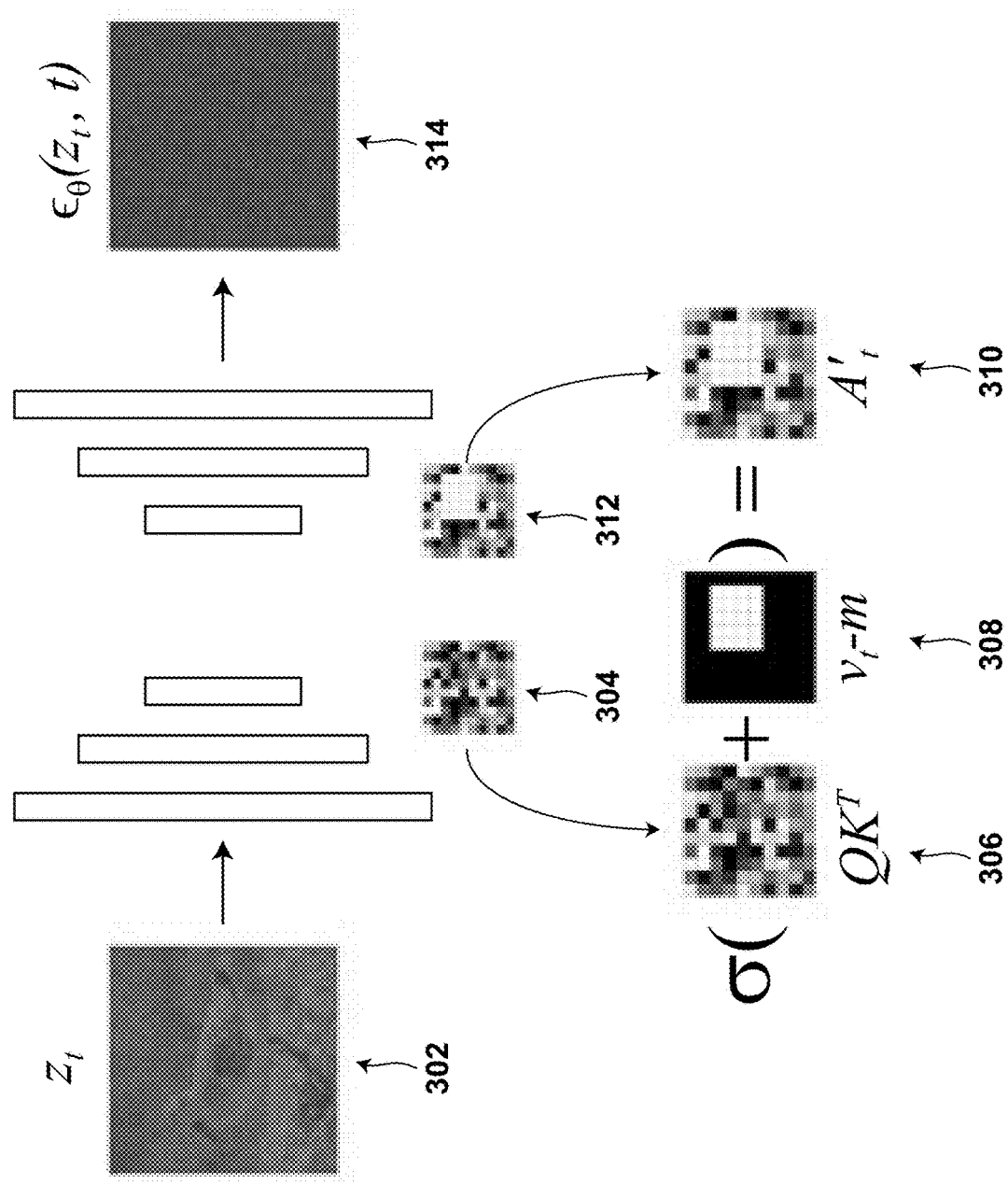
FIG. 3A is a schematic view of a content generation process using the system.

A schematic view of the application of equation (14) is shown in FIG. 3A (discussed in further detail below).

The score $s_{\theta*}(x_t, t)$ is modified such that the sampled latent more closely corresponds to the desired layout. This affords smaller, yet effective, update steps with loss-guidance.

As far as implementation, attention injection from timestep T to $t_{inject}$ in order to obtain a latent $x_{t_{inject}}$ that can be further refined via loss-guidance. In practice, it is useful to perform loss-guidance simultaneously, from timestep T to $t_{loss}$, where $t_{loss} < t_{inject}$.

| | Algorithm 1 Pseudocode |
|---|---|
| 1: | Initialize $z_T \sim \mathcal{N}(0,1)$ |
| 2: | for t = T, . . . , 1 do |
| 3: | $\epsilon_{pred}(z_t, t) = \begin{cases} \epsilon_\theta(z_t, t, A_t \rightarrow A'_t) & \text{if } t > t_{inject} \\ \epsilon_\theta(z_t, t) & \text{otherwise} \end{cases}$ |
| 4: | $\ell_y(A_t) = \begin{cases} g_1(\overline{m} \odot A) - g_2(m \odot A) & \text{if } t > t_{loss} \\ 0 & \text{otherwise} \end{cases}$ |
| 5: | $\hat{\epsilon} = \epsilon_{pred}(z_t, t) + \eta \sigma_i \nabla_{z_i} \ell_y(A_t)$ |
| 6: | end for |

In an embodiment of the present specification, the system utilizes pre-trained diffusion models to achieve controllable layout generation for e-commerce product images. This embodiment leverages the inherent capability of these models to manage complex data densities, thus eliminating the need for additional parameters or specialized training schemes. The system employs a flexible architecture that facilitates an inference-time algorithm for layout control, ensuring that the generated images are both accurate and of high quality.

The method combines loss-guidance and attention injection, capitalizing on their complementary nature to enhance layout generation. According to examples of the present specification, loss-guidance alone could be inadequate for producing the correct image, as it could suppress attention outside of the desired mask, preventing objects in the prompt from appearing in the scene. However, integrating attention injection allowed for a more dynamic entry of objects into the scene, improving the overall layout and detail of the images.

Embodiments of the present specification further explored controlled generation techniques in outpainting tasks, an aspect in e-commerce where product images are integrated into more suitable backgrounds for display. This was achieved through the strategic manipulation of cross-attention for layout control, highlighting the system's efficiency and practicality without necessitating external conditioning or extensive computational resources.

Moreover, the specification recognizes the potential of extending controlled generation techniques beyond diffusion models. Techniques like generative adversarial networks (GANs) and variational autoencoders (VAEs) could also be adapted to enhance the e-commerce experience, suggesting a versatile application of AI in creating detailed and contextually rich product images.

This embodiment presents a significant advancement in the application of generative models for e-commerce, providing a method and system for generating high-quality product images. The approach ensures the preservation of product details and seamless integration with existing platforms, thus improving conversion rates and search discoverability. Additionally, the system's use of real-time market data enables continuous refinement of product listings, ensuring they remain relevant and effectively meet market trends and consumer preferences.

Now with reference to the drawings, system 100, as depicted in FIG. 1, includes server 102. Server 102 includes the processor 104, memory 106, and data storage 108, with the processor executing computational tasks, the memory facilitating data access, and the data storage archiving processed information. The preprocessing and analytics module 110 is responsible for initial data handling, interfacing with local database storage 112 for temporary data retention and multimodal vector database 114 for storing vectorized data, aiding in subsequent analytical processes. Content generation module 120 is responsible for the creation of e-commerce listings, utilizing loss-guided diffusion models 122 for image generation. It also employs an auto-prompting LLM model 124 to automate text generation, and dynamic template generation module 126 to tailor content layout. Context-injection module 128 enhances content relevancy by incorporating real-time data through data retrieval integration 130 and utilizing contextual data 132, ensuring the content remains aligned with current market conditions. A listing quality score estimation module 116 evaluates the content's potential market performance, and the actionable recommendations module 118 provides suggestions for content optimization based on this evaluation.

Figure 2:
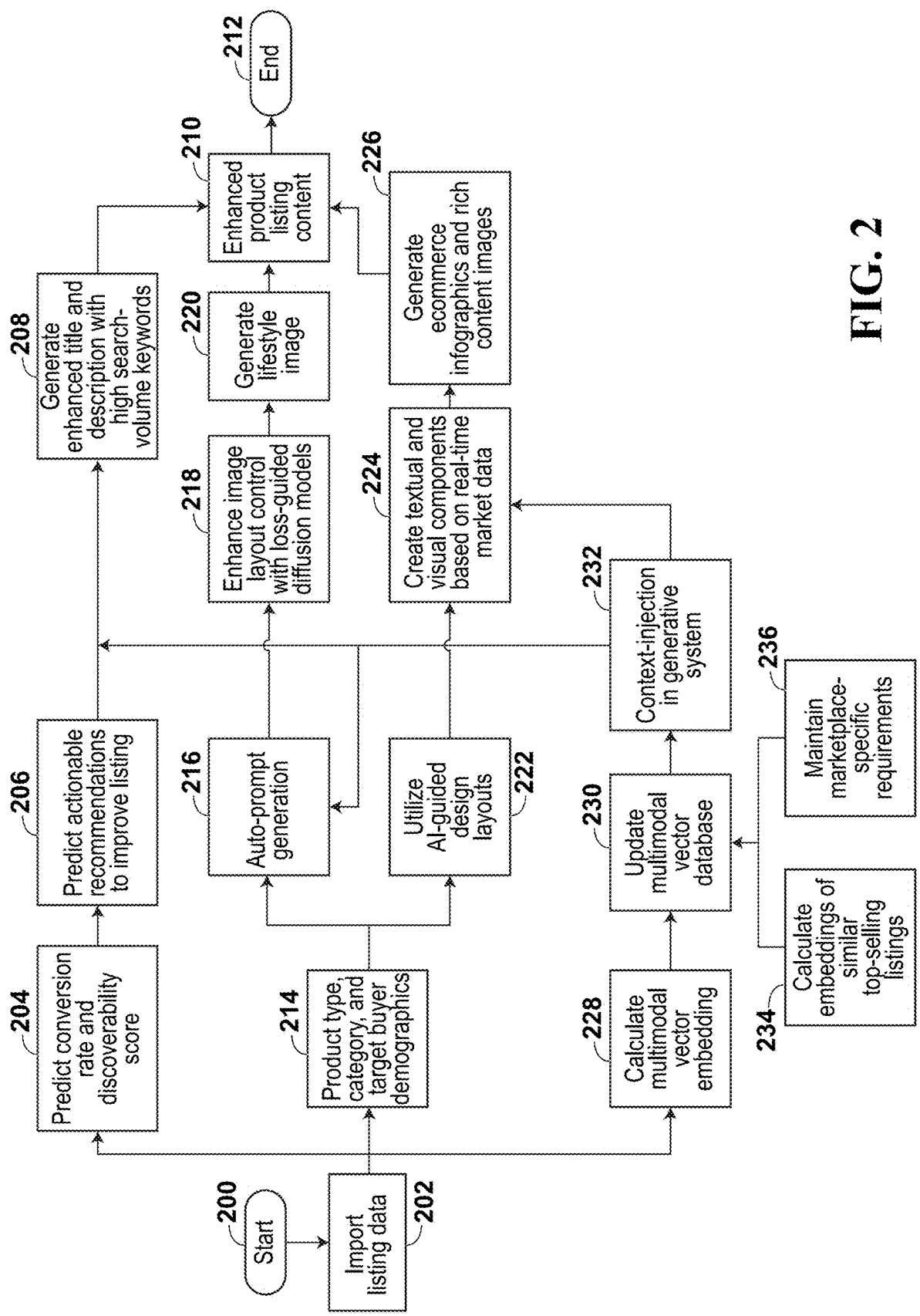
FIG. 2 is a flowchart of an exemplary process within a system for enhancing content and layout control in e-commerce listings.

According to an exemplary method within system 100 for enhancing content and layout control in e-commerce listings, illustrated in FIG. 2, the process commences with the import of listing data 202. This step is for gathering product information for subsequent analysis and optimization. The method continues with predicting the conversion rate and discoverability score, at 204, and identifying actionable recommendations to improve the listing, at 206. At 208, enhanced title and description generation with high search-volume keywords is then executed. At 220, the workflow includes generating lifestyle images to visually engage potential customers, complemented by enhancing image layout control with loss-guided diffusion models, at 218, to improve image quality and relevance. At 216, auto-prompt generation and the use of AI-guided design layouts, at 222, refine the content creation process. The process further involves creating textual and visual components based on real-time market data, at 224, and generating e-commerce infographics and rich content images, at 226, which enhance the listing's informativeness and appeal. Calculating multimodal vector embedding, at 228, and updating the multimodal vector database, at 230, are used for analyzing and leveraging complex data relationships, enhancing the system's content generation and optimization capabilities. The use of the term "multimodal vector embedding" refers to a mathematical representation of data from multiple sources or modes, converted into vectors in a high-dimensional space. In the context of machine learning and AI, this embedding process involves transforming various types of data, such as text, images, and audio, into a unified vector form that can be analyzed and processed by algorithms. This method allows for the integration and interaction of different data types, enhancing the system's ability to understand and leverage the complex relationships inherent in multimodal information. In the context of machine learning and data processing, "vectors" refer to an array or list of numbers that represent data points in a multi-dimensional space. Each number in the vector acts as a coordinate in one dimension, helping to locate the data point within that space. Vectors are used for representing and processing data in machine learning models, as they provide a structured way to input, analyze, and manipulate information. They enable the mathematical operations and transformations that are fundamental to machine learning algorithms, allowing these models to learn from and make predictions based on data.

Still with reference to FIG. 2, at 232, context-injection in the generative system (refers to the integration of dynamic market and product data into the content generation process, supported by calculating embeddings of similar top-selling listings, at 234, and maintaining marketplace-specific requirements, at 236. This ensures that the generated listings are not only competitive but also compliant with and responsive to market standards and trends. The method results in the production of enhanced product listing content, at 210, marking the end 212.

FIG. 3A illustrates an exemplary use of equation (14), as discussed above, to convert the attention map at time t, $A_t$ into $A'_t$. The two are identical everywhere except for the region defined by m, where the attention is enhanced according to the time-dependent scaling factor $v_t$. This means that while the rest of the attention map remains unchanged, the specified region m undergoes a transformation that increases its attention values, effectively focusing the model's awareness or sensitivity to that part of the input at time t.

Figure 3B:
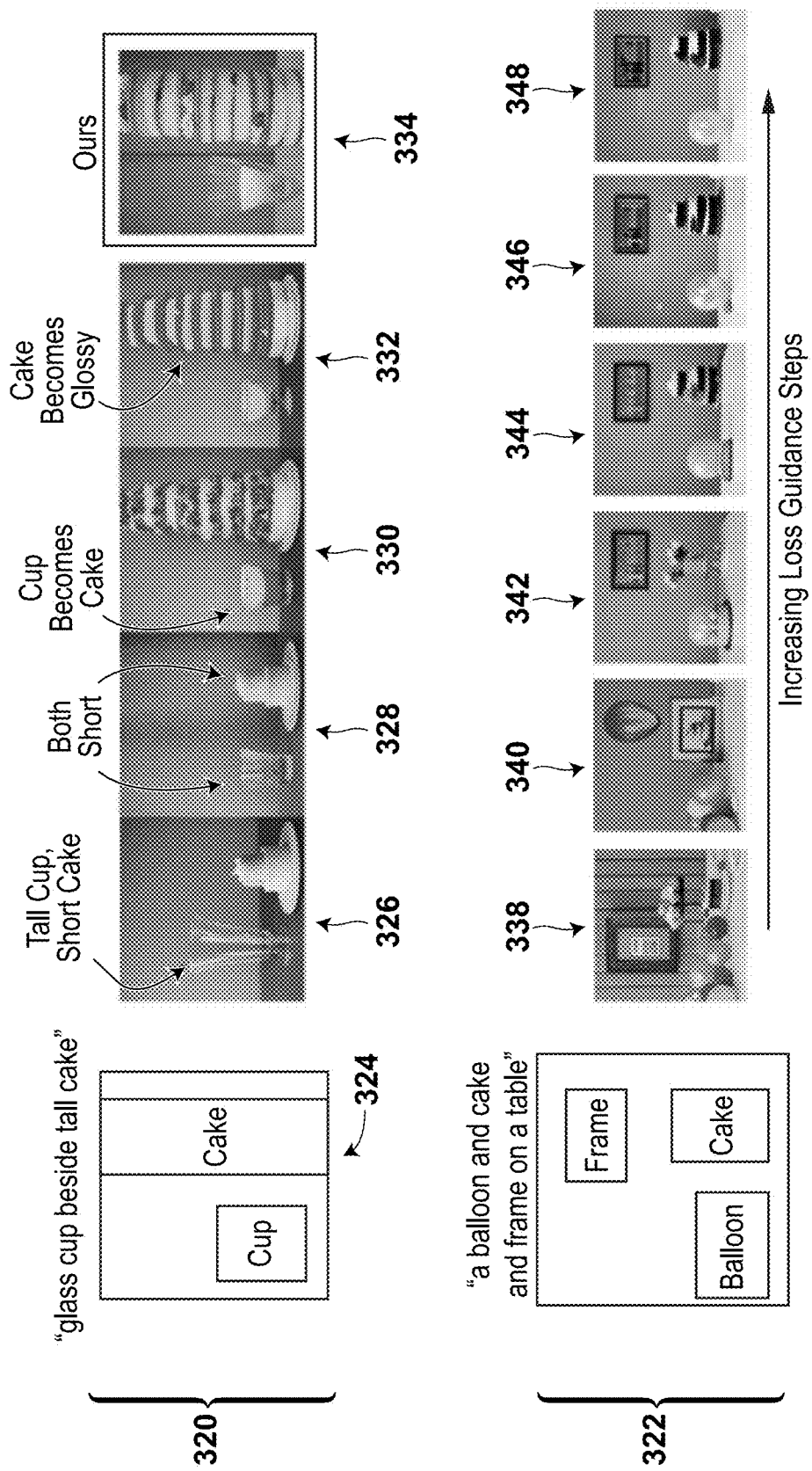
FIG. 3B is a schematic view of an image diffusion process with loss-guidance using the system.

FIG. 3B demonstrates the application of attention injection and loss-guidance. In row 320, the first four images illustrate the effects of using injection alone, resulting in significant mixing and misattribution. For instance, with the prompt "glass cup beside a tall cake" at 324, box 326 depicts a tall cup and a short cake, box 328 shows both items as short, box 330 presents a cup morphing into a cake, and box 332 illustrates a cake adopting glass-like properties. Box 334, however, displays the outcome when combining attention injection with loss-guidance, as specified in the present system, achieving the desired distinct representations. In row 322, six images demonstrate the impact of incrementally increasing the steps of loss-guidance. With the input "a balloon and a cake and frame on a table" shown at 336, these images progressively show the separation and clearer definition of each item, reducing or "disentangling" the attribute mixing. Box 338 depicts several balloons and a plate of cupcakes, while box 340 presents a framed picture of a cake. Box 342 illustrates a cake topped with a balloon-like feature, and box 344 shows a cake positioned in the background instead of on the table, alongside a distorted balloon. Box 346 displays some artifacts behind the balloon, indicating a partial mix of elements. Finally, box 348 reveals a well-composed scene where the elements are distinct and correctly attributed.

Figure 4:
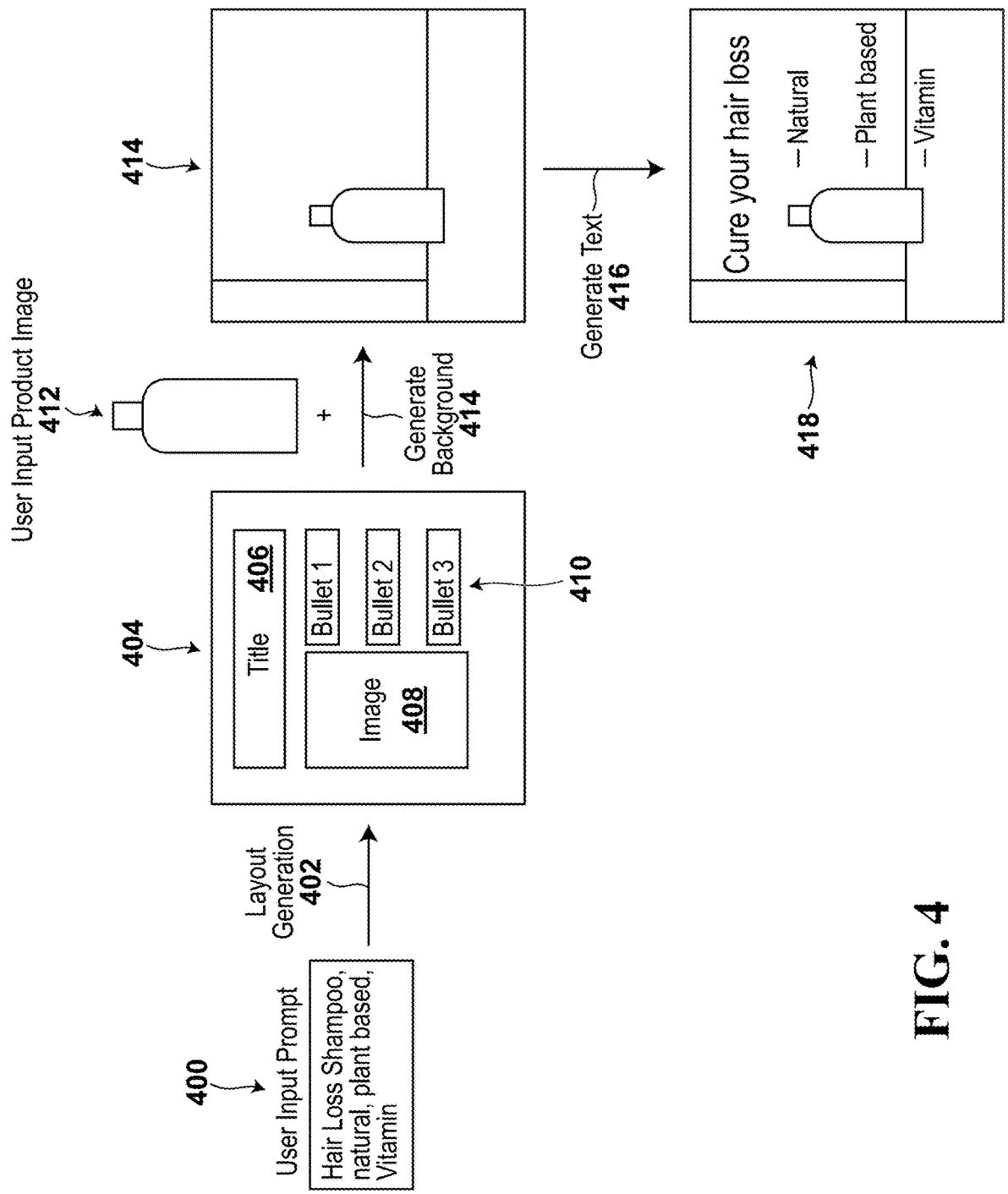
FIG. 4 is a schematic view of an infographic generation process using the system.

In FIG. 4, an exemplary method for creating an infographic for a product, such as "Hair Loss Shampoo," uses a text-to-image diffusion model. The process begins with a text input at 400, where the user provides descriptive prompts like "natural plant-based" and "Vitamin." The product image is inputted at 412, serving as a visual element for the infographic. The system 100 generates a layout for the infographic at 404, organizing the textual and visual elements in a coherent structure, using a title 406, an image 408 and bullet points 410. This layout integrates with the background generated at 414, enhancing the overall aesthetic appeal of the infographic. The resulting infographic at 418 is the culmination of this process, where the generated content, including enhanced product images and textual descriptions, is combined to communicate the product's features effectively. The use of a diffusion model according to embodiments of the present specification, enables the creation of photorealistic images from text inputs, providing a sophisticated tool for generating marketing materials in e-commerce.

Figure 5:
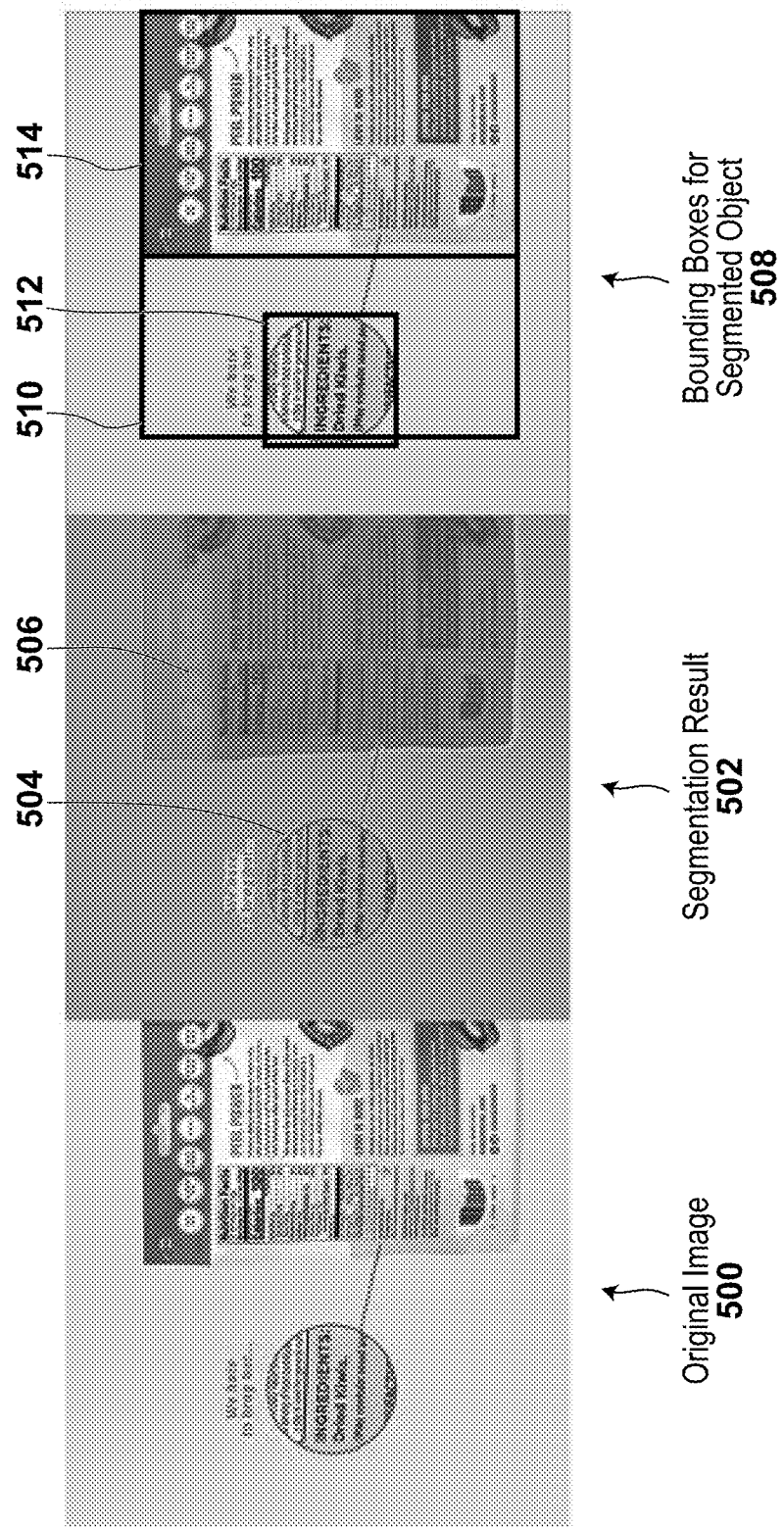
FIG. 5 is a schematic view of an image segmentation process using the system.

FIG. 5 illustrates, in a schematic form, an exemplary process for generating an image segmentation. The process starts at 500 with the original image, which can be images of top-performing products gathered from various marketplaces. These images serve as the primary dataset for training the layout generation model. The next phase at 502 involves a segmentation process. This step identifies and isolates individual objects within the images, facilitating an analysis of the image content. The segmentation model delineates different elements in the image, producing segmented results that highlight distinct objects and features. Subsequently, bounding boxes for segmented objects are defined at 508. In this stage, bounding boxes are drawn around each segmented object identified in the previous step. These bounding boxes encapsulate the spatial location and extent of each object within the images, providing structured data that the layout generation model uses for training. The training of the layout generation model with these bounding boxes enables the model to learn and understand various layout patterns and object arrangements that are prevalent in successful product listings. To enhance the training data's quality, bounding boxes occupying less than about 5% of the image area can be filtered out, according to one example. However, in other examples, the threshold for filtering out bounding boxes could be higher or lower, depending on the specific requirements of the training dataset and the objectives of the model being developed. This filtering ensures that only significant and/or relevant objects are considered in the layout learning process, thereby improving the model's ability to generate effective and visually appealing infographic layouts. The output of this process is a model capable of generating optimized infographic layouts for specific products, leveraging the learned patterns and arrangements from the high-performing product images in the dataset.

According to one example of the present specification, both visual and textual assets are generated to populate the previously designed layout template. According to this example, Large Language Models (LLMs) are fine-tuned to generate product-specific text, aligning the content with the unique aspects of the product category. The term "Large Language Models" refers to AI systems that process and generate human-like text by learning from a vast corpus of existing textual data. These models are "large" due to the substantial number of parameters they contain, allowing them to understand and produce a wide range of language patterns, structures, and nuances. This fine-tuning process necessitates extensive training on large datasets, encompassing product descriptions, specifications, and features to accurately capture the product's nuances. Furthermore, image assets are created, some of which may involve removing backgrounds from product images. The skilled reader will appreciate that background removal is an image processing task, aimed at preserving product details and ensuring a professional appearance in the final infographic. The text size, position, and formatting can be adjusted dynamically, based on the template's available space. Similarly, the positioning of image assets within the layout prevents overlap and ensure visual consistency.

Furthermore, according to some examples of the present specification, the context-injection module maintains a multimodal vector database, continually updated with embeddings of top-selling listings and real-time product data, including sales performance and consumer behavior metrics. This database supports the generation of content that is both relevant and optimized for market performance. When a generation request is made, the system retrieves this contextual data to produce an enhanced listing content, further tailored to marketplace demands and best practices.

Figure 6:
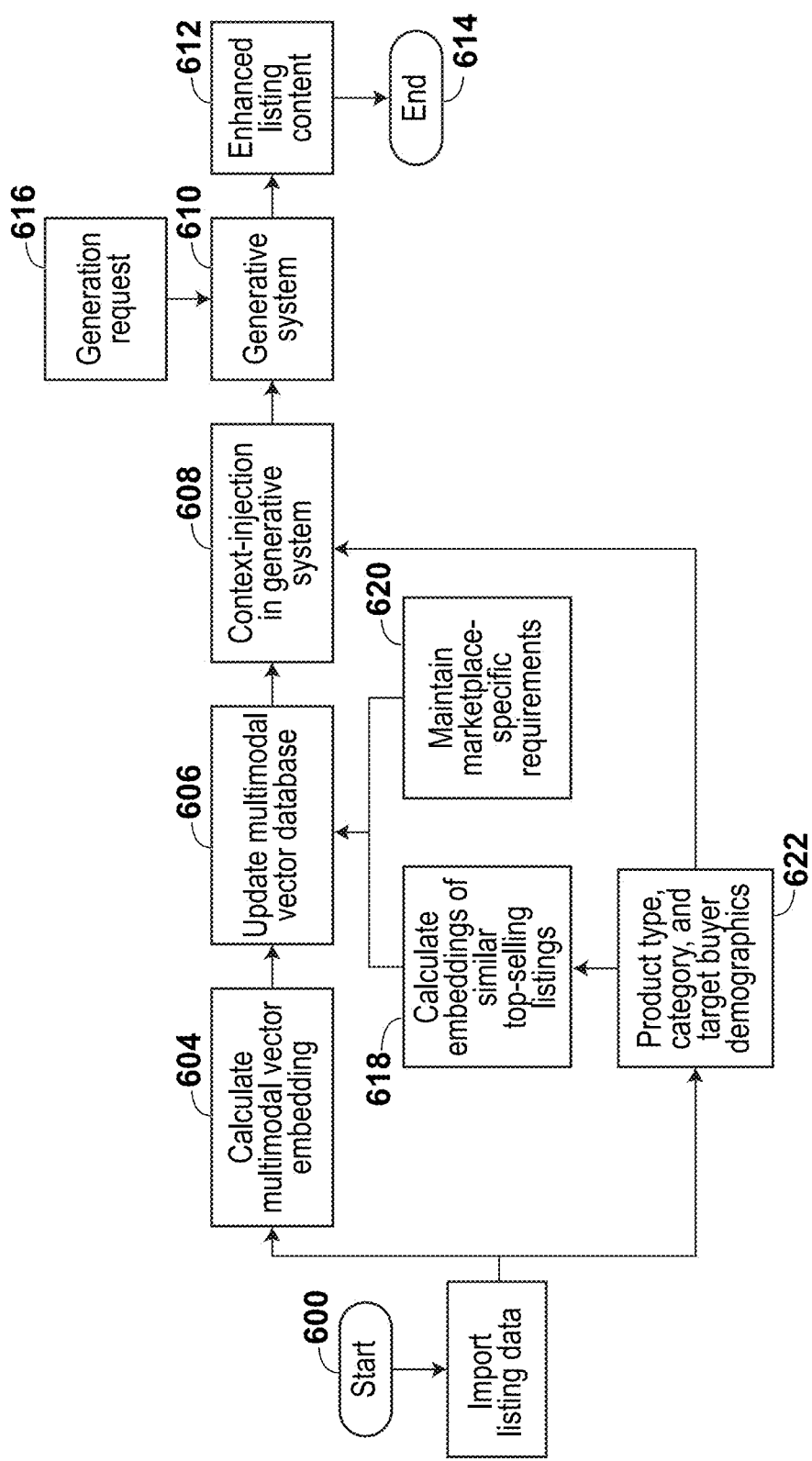
FIG. 6 is a flowchart illustrating an exemplary context-injection process using the system.

The exemplary method depicted in FIG. 6 illustrates the context injection process. This process starts at 600 and moves to importing listing data at 602, where information for the product listings is gathered. Upon collecting the data, at 604, the system progresses to calculate the multimodal vector embeddings. This step transforms raw listing data into a structured form that can be analyzed and used for further optimization. Following this, the system updates the multimodal vector database 114, at 606, with the new embeddings, ensuring that the generative system 100 has access to the latest data for content creation. Context-injection in the generative system occurs at 608. At 616, a generation request triggers the generative system 100 at 610 to produce the enhanced listing content, at 612. Additional steps in this process include calculating embeddings of similar top-selling listings, at 618, to benchmark against the market's best performers, and maintaining marketplace-specific requirements, at 620. The method of FIG. 6 demonstrates a dynamic approach to optimizing product listings resulting in the enhanced listing content at 612. The method concludes at 614 and in some examples, can return to the start 600, or to receive generation requests at 616.

Figure 7:
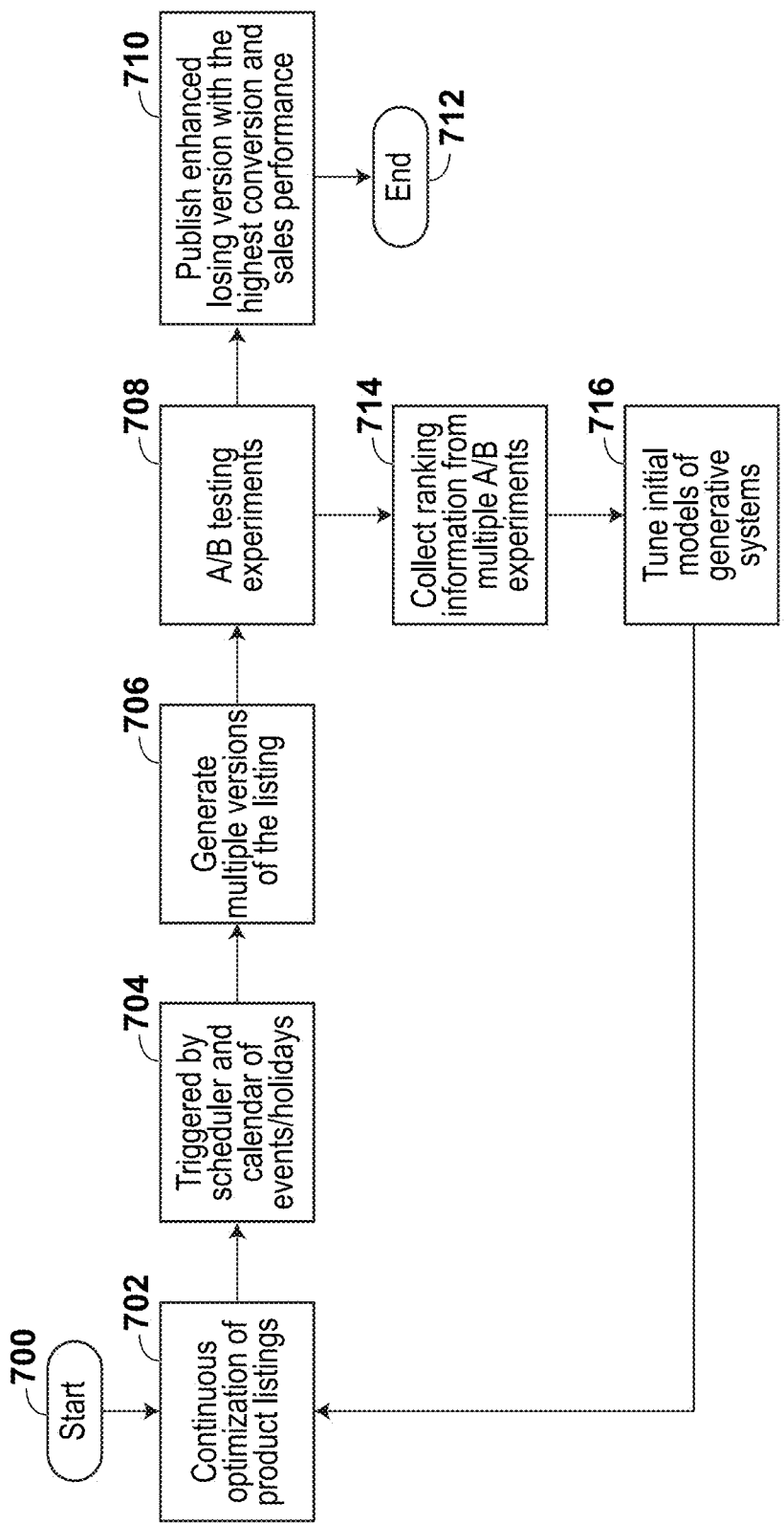
FIG. 7 is a flowchart illustrating an exemplary continuous optimization process using the system.

FIG. 7 illustrates an exemplary continuous optimization process of product listings using real-time data. The process begins at 700 and moves to the continuous optimization of product listings, at 702. The optimization process is triggered by a scheduler and calendar of events/holidays, at 704. This consideration of holidays and events is relevant because consumer behaviour and purchasing patterns often change significantly during these periods, presenting opportunities for targeted marketing and sales strategies that can enhance the performance of e-commerce listings. Following this trigger, multiple versions of the listing are generated at 706 to test different variations and determine the most effective version. These versions are then subjected to A/B testing experiments, at 708, an approach that allows for comparative performance analysis based on actual user interactions. Through these experiments, data on conversion and sales performance is gathered to identify the most successful listing version. The enhanced listing version with the highest conversion and sales performance is then published at 710, ensuring that the most effective content is presented to potential customers. Subsequently, ranking information from the A/B experiments is collected, at 714, to provide insights into the performance of different listing versions. This collected data is used to tune the initial models of the generative system, at 716, refining the algorithms and strategies employed in content generation. The process concludes at 712. Advantageously, listings are continually refined and updated in response to market dynamics and consumer preferences, enhancing their effectiveness and performance in the marketplace.

Figure 8A:
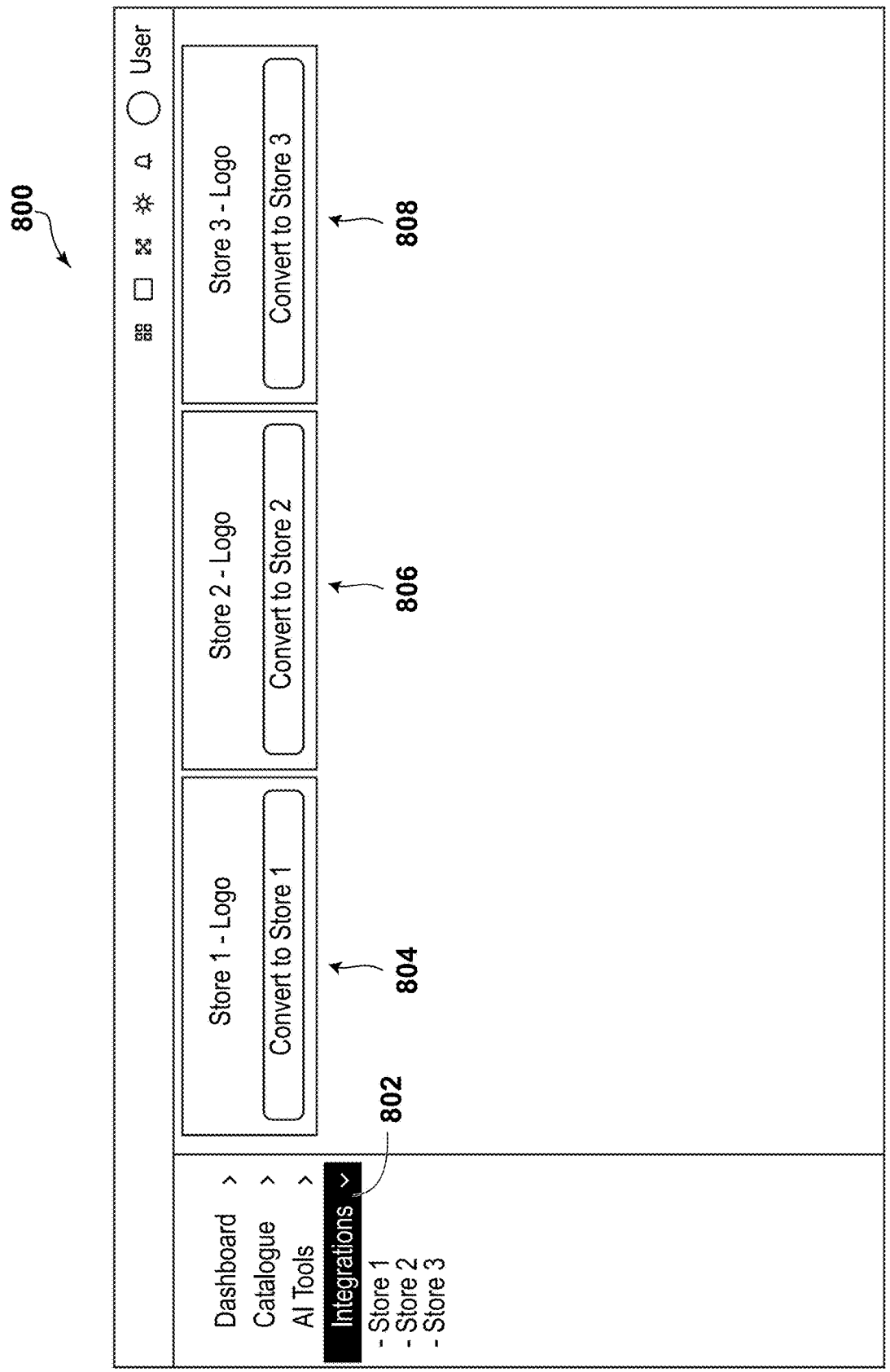
Figure 8B:
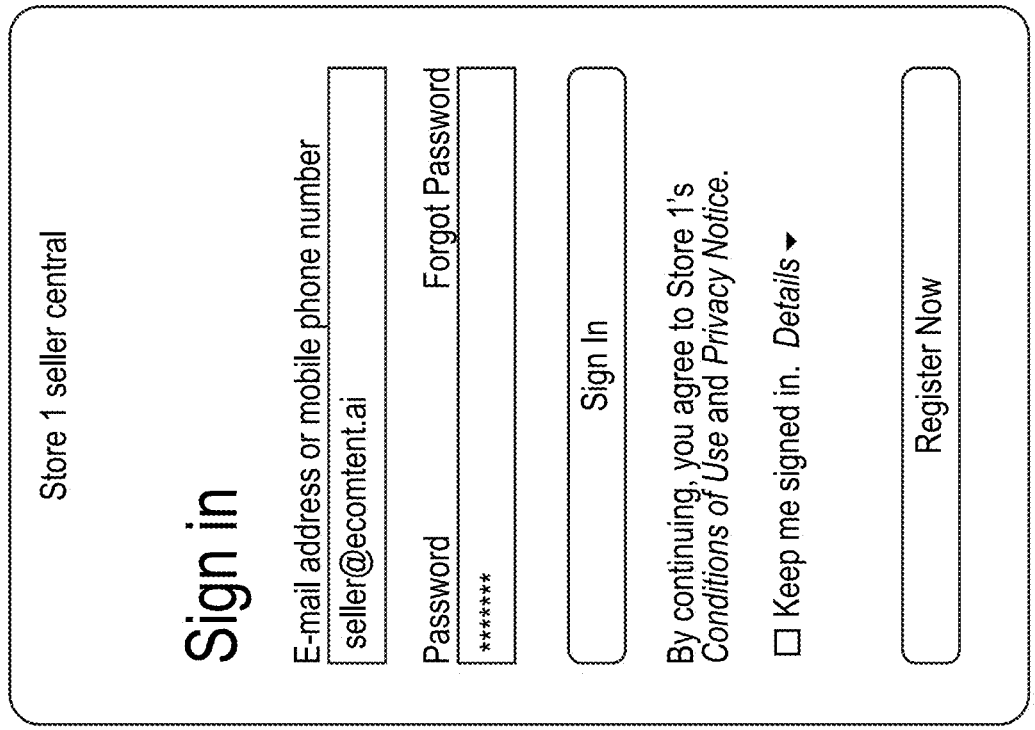

Turning to FIG. 8A and FIG. 8B, exemplary user interface screens for managing e-commerce listings are illustrated. FIG. 8A shows a dashboard with sections like "Catalogue" and "AI Tools" for managing and optimizing listings. It includes options for integrating listings across multiple platforms or accounts ("Store 1," "Store 2," "Store 3"), each with a conversion button, indicating functionality for listing synchronization and enhancement across platforms.

FIG. 8B presents a login screen for secure access to the integration tool, with fields for email/phone and password, and links for password recovery and new user registration. This screen is part of the security framework that controls access to the tool's features for optimizing product listings on e-commerce platforms.

FIG. 9 illustrates an exemplary user interface for managing and optimizing e-commerce listings. The interface features a search bar 902 for locating listings and presents a series of product listings 910 with details such as category, image count, price, and an optimization score. Each listing is accompanied by recommended actions 916a-916i like adding infographics or updating descriptions to enhance the listing's effectiveness. Users can filter listings by category 906 and other criteria like discounts 908, with a summary of listings displayed 912. This interface is designed for efficiency, enabling users to quickly identify and execute optimization strategies for their e-commerce listings.

Figure 10:
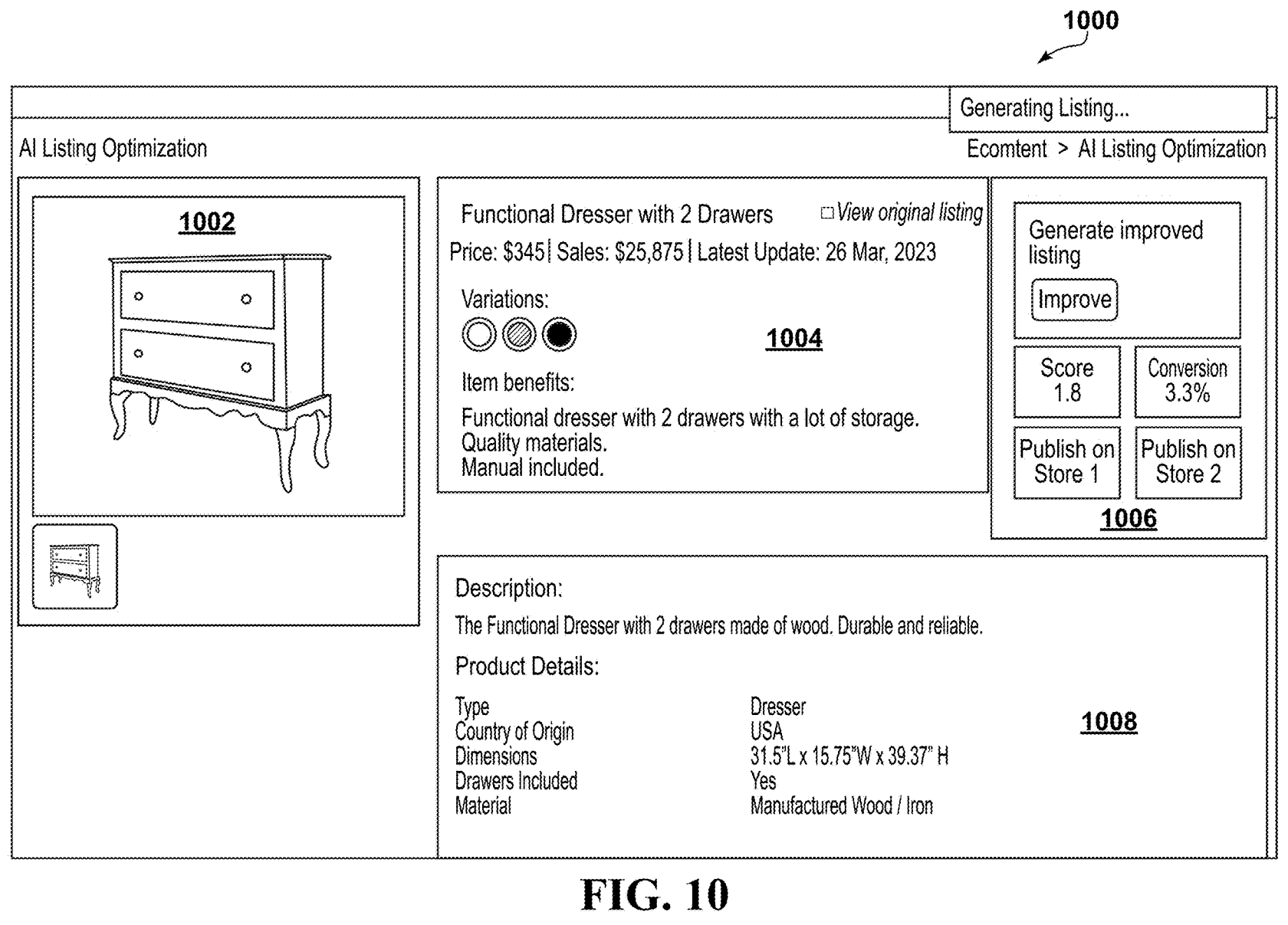

Turning to FIG. 10, a further exemplary user interface for managing and optimizing e-commerce listings, demonstrating functionality in enhancing e-commerce product listings. One feature of this interface is the "Generating Listing" area 1000, where the optimization process is initiated for a product, in this case, a "Functional Dresser with 2 Drawers." Details such as the price, sales data, and the date of the last update are displayed, providing an overview of the product's market performance. A notable aspect of the interface is the optimization score and conversion rate section 1004, which evaluates the current effectiveness of the product listing and suggests potential for improvement. Users are equipped with options to "Generate improved listing" or directly publish the optimized listing on multiple store platforms through designated action buttons 1006. Furthermore, the interface includes a detailed description and product details section 1008, offering an in-depth look at the product's features, including its dimensions, materials, and other relevant specifications. This detailed information supports the optimization process by ensuring that pertinent product attributes are considered and presented in the listing.

Figure 11:
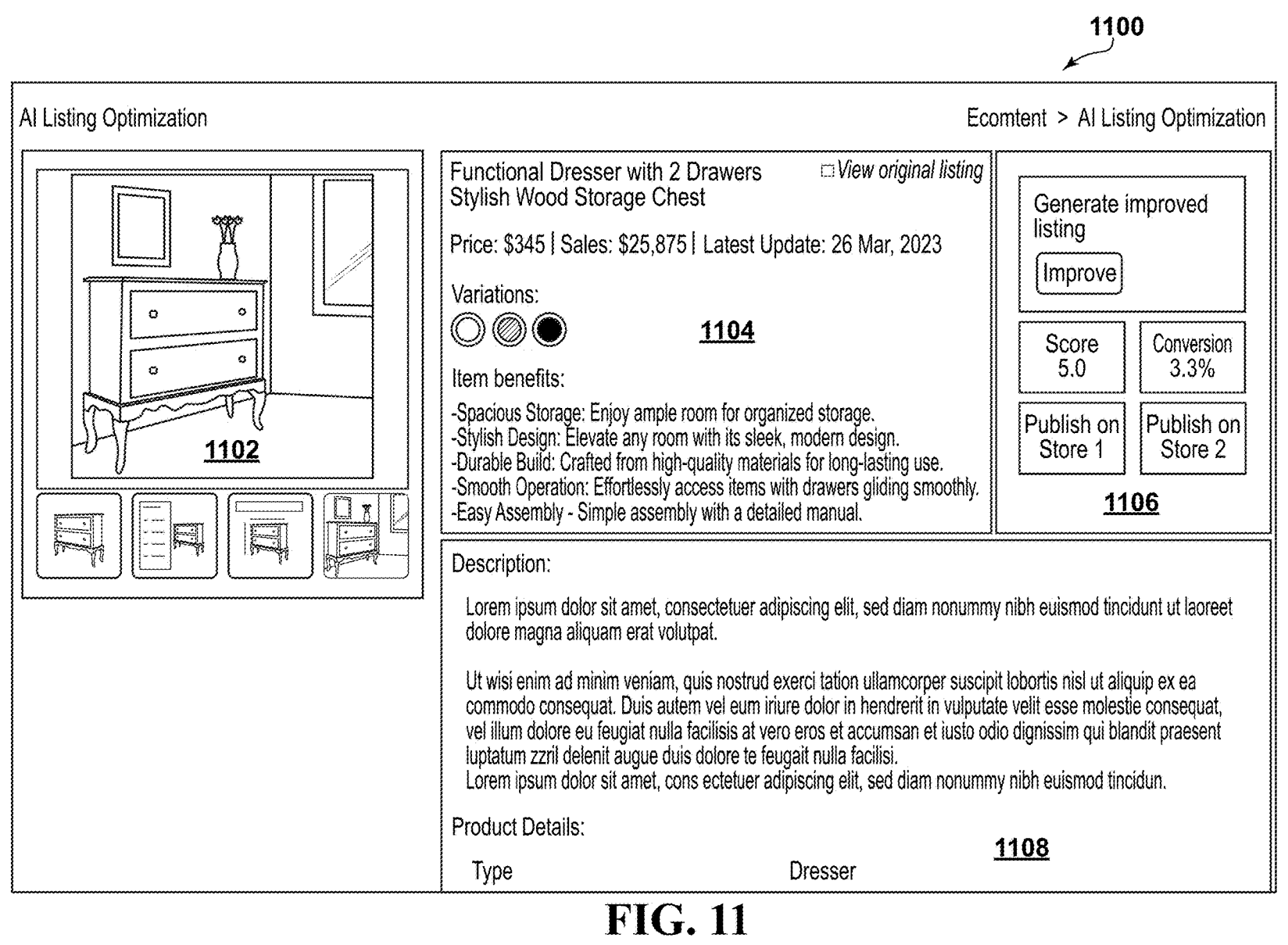

In FIG. 10, the product "Functional Dresser with 2 Drawers" is shown with basic details such as price and sales figures. The optimization score and conversion rate are presented, but the details are minimal. In contrast, FIG. 11 post-optimization, reveals significant enhancements. The product title is expanded to "Stylish Wood Storage Chest," accompanied by an improved listing that highlights key benefits like spacious storage, stylish design, durable build, smooth operation, and easy assembly. The optimization score has improved to 5.0, and the conversion rate increased to 3.3%. The description is more detailed and product-specific, replacing the basic text with relevant content that better describes the product and its features. After using the user interfaces according to examples of the present specification, the product listing is enhanced with a detailed and compelling description, improved key benefits, and higher optimization and conversion rates, demonstrating the tool's effectiveness in elevating the quality and appeal of e-commerce listings.

Figure 12:
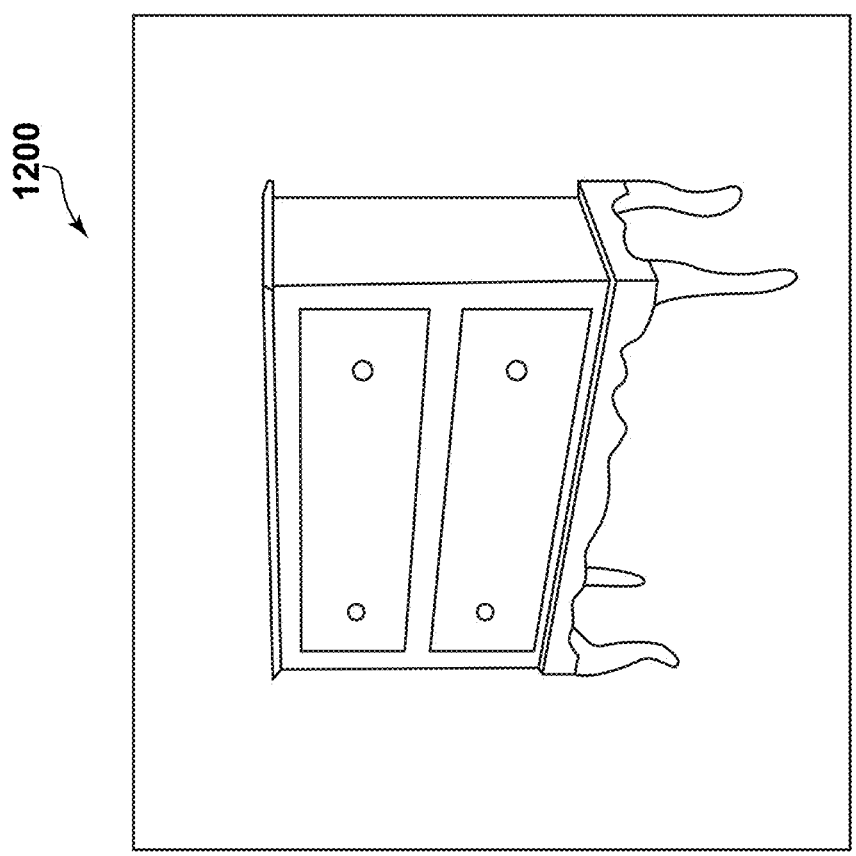

According to embodiments of the present specification, exemplary product images are shown in transition from FIG. 12 to FIG. 13A, FIG. 13B, and FIG. 13C. FIG. 12 shows the original product image. In contrast, FIG. 13A introduces detailed benefits such as "Guaranteed Long Lasting" and "Quick No-Tool Assembly," among others, providing specific value propositions to the potential buyer. These elements, indicated by references 1300a, enhance the product's appeal by addressing practical and quality concerns. Furthermore, FIG. 13B expands on the product's dimensions, giving exact measurements, while FIG. 13C emphasizes the style, describing it as "Classic European Cabinetry." These additional details furnish the listing with a comprehensive view of the product, aiding consumers in making informed decisions based on the product's size, style, and functional benefits. The transition from the original image to the replacement images is aimed at improving customer engagement and conversion rates.

Figure 14:
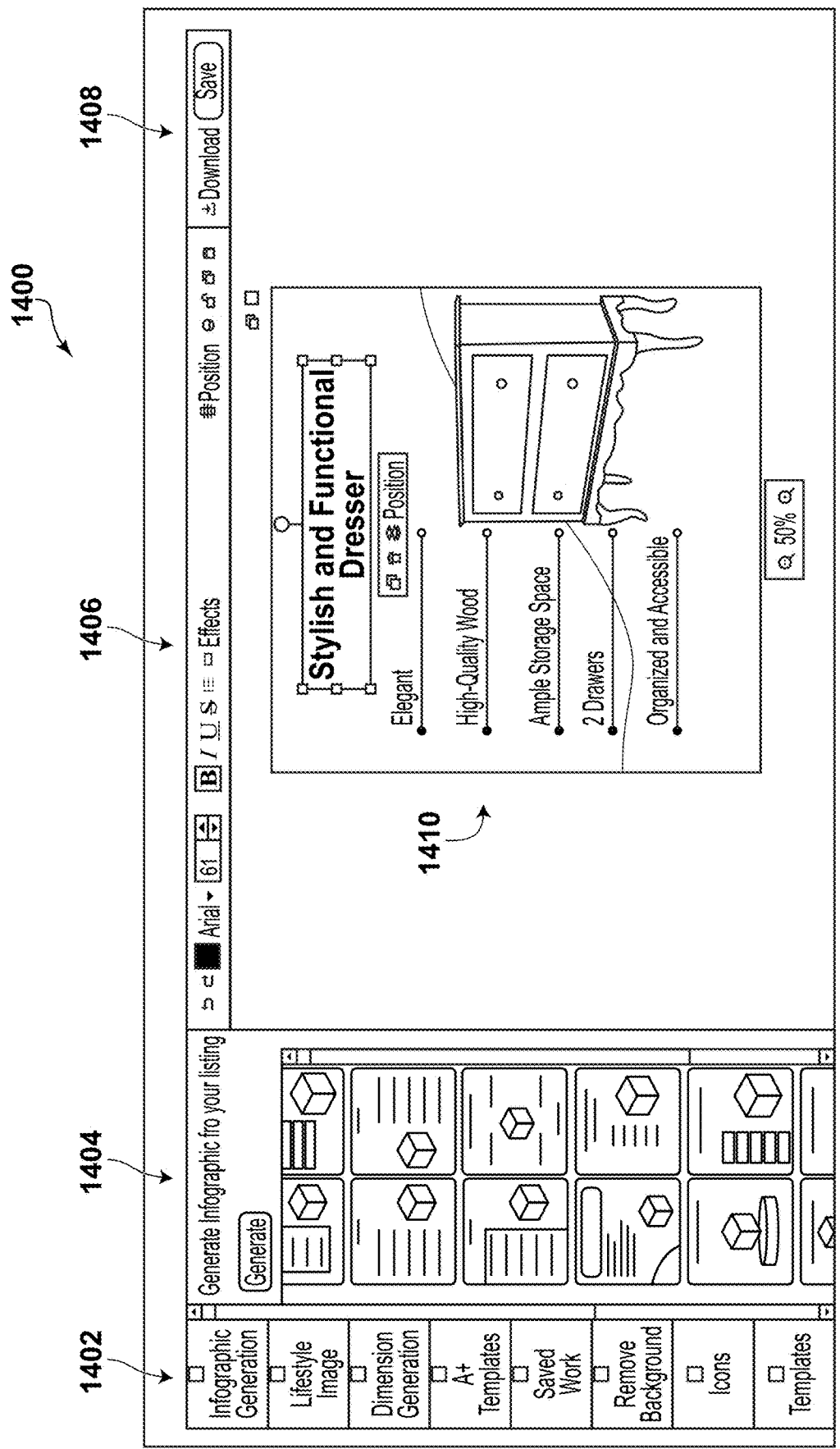
FIG. 14 to FIG. 15 are additional screenshots showing various user interfaces demonstrating features for managing and optimizing e-commerce listings.

FIG. 14 illustrates an exemplary infographic and lifestyle image generation interface for an e-commerce listing optimization tool. The interface includes features for generating infographics 1402 tailored to the product listing, indicating functionality for creating visually appealing content to enhance product descriptions. Elements like dimension generation 1406, templates 1408, and options to save work or remove backgrounds 1410 are visible, providing tools designed to customize and refine the product images and layout for the listing. Icons and text formatting tools provide detailed customization capabilities, allowing for the creation of professional and organized listings that highlight the product's features effectively.

Figure 15:
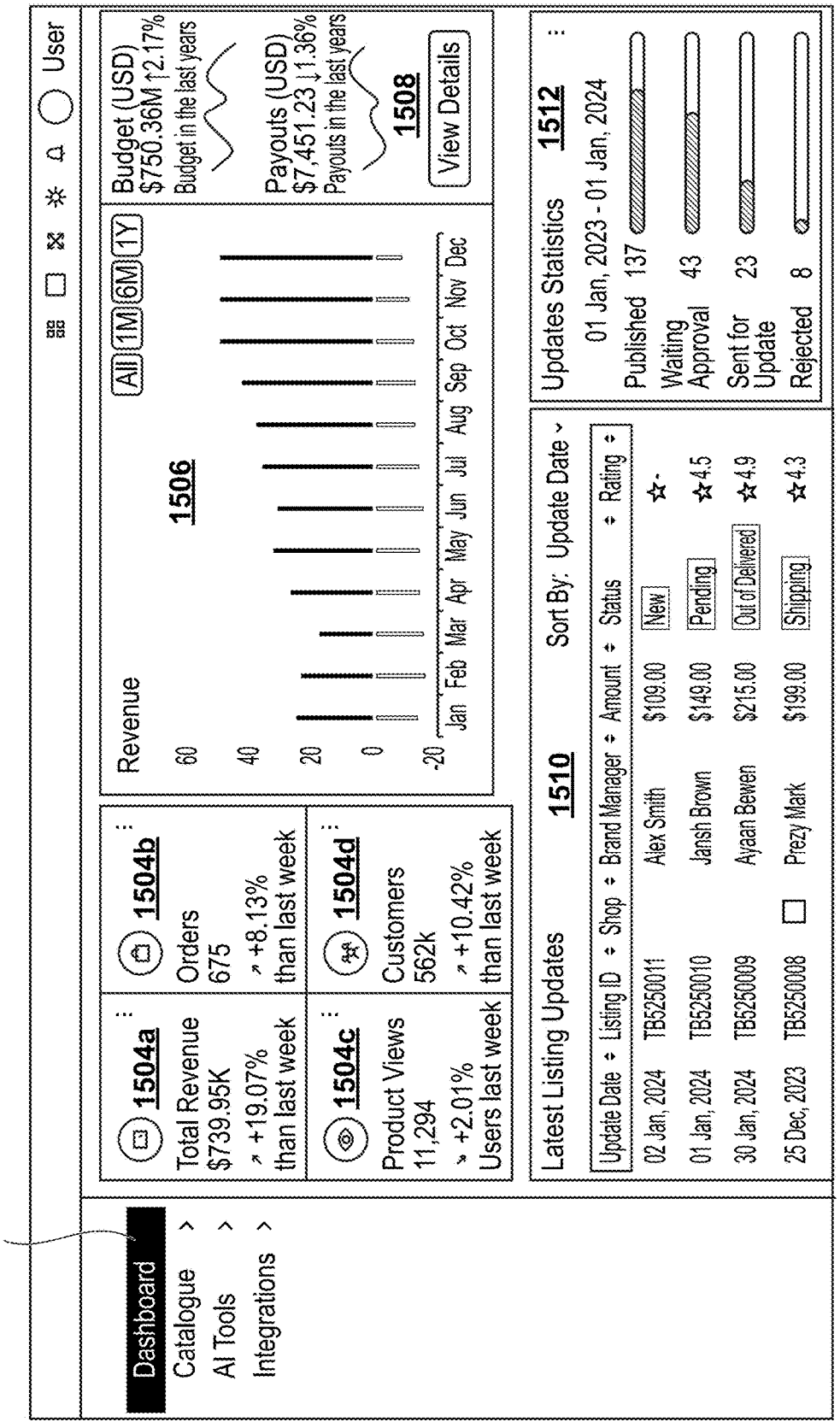

FIG. 15 shows an exemplary dashboard for managing e-commerce operations 1500. The dashboard 1500 provides key performance metrics such as total revenue 1504a, orders 1504b, product views 1504c, and customer counts 1504d, with comparative data from the previous week to track performance trends. Graphical representations of revenue 1506 and payouts 1508 over time offer visual insights into financial trends, and a section for latest listing updates 1510 provides access to recent activity. A brand manager section 1512 lists contacts for various roles.

The exemplary interfaces and tools depicted in the drawings can be substituted, varied, or altered without departing from the scope of the present specification. For example, the dashboard layout of FIG. 8A could be customized to suit different user preferences or operational requirements. Elements like performance metrics, product listing sections, or AI tools could be rearranged, added, or removed based on user feedback or evolving business needs. Furthermore, the specific functionalities of infographic generation, layout customization, and performance tracking, could be enhanced or simplified. Advanced AI algorithms could be integrated to provide additional or different analysis and recommendations for listing optimization. Alternatively, a more basic version of the tool could be offered to cater to users with limited technical expertise or resources. In terms of graphical user interface (GUI) design, alternative color schemes, fonts, or icon sets could be employed to align with different branding requirements or to improve accessibility for users with visual impairments. The interaction design could also be modified to support various input methods, such as touch, voice commands, or gesture control, expanding usability across different devices and user contexts. The user interface of the system can be varied or substituted to enhance user experience and interaction. Depending on the user's preference or device compatibility, the interface could be web-based, mobile, or desktop applications.

The system architecture and user interface tools, as outlined in the patent specification, allow for flexibility to accommodate various computational demands and user interaction models. The computer hardware for the system is designed to support a wide range of machine learning models such as neural networks, decision trees, and support vector machines. This design ensures that the system can handle complex data processing tasks including collection, cleaning, normalization, and analysis, used for generating actionable insights from large datasets. Furthermore, the machine learning algorithms can be adapted to employ different learning techniques, including supervised, unsupervised, or reinforcement learning, based on the specific requirements of the e-commerce platform optimization. The training of these models can leverage extensive datasets, continuously refining the system's accuracy and performance in real-time listing optimization. Implementing the system on a cloud-based infrastructure offers scalable computing resources and storage, suitable for large-scale applications. Networking technologies enable the system to access distributed data sources, integrate with other systems, and deliver services to users across the Internet, enhancing the e-commerce platform's capability to maintain up-to-date and relevant product listings.

Embodiments of the present specification use pre-trained diffusion models for controllable layout generation, leveraging these models' capabilities to manage complex data densities efficiently. The skilled reader will appreciate that the technique of controlled generation is particularly useful in outpainting tasks, where it integrates product images with suitable backgrounds for online display, using text-to-image diffusion models. The manipulation of cross-attention for layout control enhances the method's efficiency and practicality, reducing the need for external conditioning or extensive computational resources. However, the skilled reader will appreciate that the specification extends beyond diffusion models, incorporating any other AI techniques like generative adversarial networks (GANs) and variational autoencoders (VAEs) for varied generative tasks. For example, GANs could be adapted for outpainting, while VAEs might be used for semi-structured background generation. Reinforcement learning could optimize background selection based on customer interaction data, personalizing the shopping experience.

One general aspect includes a method performed on a server, which includes a processor, memory, data storage, and a network interface device connected to a network. The method involves importing listing data using Application Programming Interface (API) connections over the network, analyzing this data to calculate a multimodal vector embedding, and estimating a quality score based on the multimodal vector embedding and real-time market data metrics. The method further includes generating content elements for e-commerce display, such as product images, textual descriptions, and infographics, based on the listing data, the multimodal vector embedding, and the quality score. This generation process applies a controlled generation algorithm through a text-to-image diffusion model to create the product images and integrates loss-guidance and attention injection within the diffusion model to produce a controlled layout of the product images. The generated content elements are then stored in the data storage.

Implementations may include one or more of the following features: The method includes retrieving product information comprising the title, description, and original images when importing listing data. It further involves updating the multimodal vector embedding using feedback from user interactions, where the feedback may include metrics like user click-through rates, time spent on the listing page, and purchase conversion rates. The method also includes dynamically updating the quality score and regenerating the content elements based on real-time market data metrics, with changes determined by a threshold for market demand, competitor pricing, and consumer behavior trends. In generating content elements for e-commerce display, the method includes fine-tuning the diffusion model on a dataset of best-performing prompts for various product categories and retrieving contextual data from a dynamic multimodal vector database. The loss-guidance in the method is based on predefined layout rules specific to a product category, with attention injection customized to highlight product features in the generated images. The controlled generation algorithm uses a segmentation model to isolate product images from their backgrounds. The method encompasses employing an automatically prompting Large Language Model (LLM) to generate prompts for the text-to-image diffusion model based on product category and target demographics, with the LLM being fine-tuned on a dataset of best-performing prompts. The infographic includes textual descriptions placed alongside or overlaid on product images to communicate product features and benefits. Generating content elements includes dynamically adjusting text size, position, and formatting in the generated images and descriptions for improved readability. The method further includes A/B testing of the generated listing content to select the best-performing version for final e-commerce display. It also involves displaying actionable recommendations for content optimization based on quality score analysis, market data metrics, and user engagement feedback.

The implementation of the method for enhancing e-commerce product listings can be executed either on a system or via a non-transitory computer-readable storage medium. In the case of a system, it would include components like memory to store instructions and a processor configured to execute these instructions. Alternatively, the same set of instructions could be stored on a non-transitory computer-readable storage medium.

While the invention has been described with reference to the specific embodiments, it will be understood by those skilled in the art that various changes may be made without departing from the scope of the present specification. Furthermore, the scope of the present specification is not intended to be limited to the specific embodiments described herein. Additionally, the range of embodiments described herein is not intended to limit the scope of the present specification. Rather, the invention encompasses all modifications and variations within the scope of the present specification.

The invention claimed is:

1. A method performed on a server comprising a processor, a memory, a data storage, and a network interface device connected to a network, the method comprising:
    importing listing data using Application Programming Interface (API) connections over the network;
    analyzing the listing data to calculate a multimodal vector embedding;
    generating content elements for e-commerce display comprising product images, textual descriptions, and infographics based on the listing data, the multimodal vector embedding, and real-time market data metrics comprising click-through rates, time spent on pages, and conversion rates;
    wherein the generating comprises:
    applying a controlled generation algorithm through a text-to-image diffusion model to create the product images; and
    wherein the controlled generation algorithm integrates loss-guidance and attention injection within the diffusion model to produce a controlled layout of the product images;
    storing the generated content elements in the data storage;
    re-generating the content elements at predetermined intervals or in response to changes in the real-time market data metrics; and
    wherein changes in the real-time market data metrics are determined based on a threshold value set for variations in market demand determined by product views and search volume, competitor pricing derived from real-time price comparisons, and consumer behaviour trends based on said click-through rates, time spent on pages, and conversion rates.

2. The method of claim 1, wherein the importing of listing data includes retrieving product information comprising title, description, and original images.

3. The method of claim 1, wherein generating content elements for e-commerce display comprises:
    fine-tuning the diffusion model on a dataset of best-performing prompts for various product categories, and
    retrieving contextual data from a dynamic multimodal vector database to enhance the multimodal vector embedding to reflect current marketplace performance data and consumer engagement metrics.

4. The method of claim 1, wherein the loss-guidance is based on a predefined set of layout rules that are specific to a product category, and the attention injection is customized to highlight features of the product in the generated images.

5. The method of claim 1, wherein the controlled generation algorithm further comprises using a segmentation model to isolate product images from their backgrounds.

6. The method of claim 1, further comprising:
    employing an automatically prompting Large Language Model (LLM) to generate prompts for the text-to-image diffusion model based on product category and target demographics.

7. The method of claim 6, wherein the automatically prompting LLM is fine-tuned on a dataset of best-performing prompts for various product categories.

8. The method of claim 1, wherein the infographic comprises textual descriptions placed alongside or overlaid on product images to communicate the features, benefits, and other information about the product.

9. The method of claim 1, wherein the generating of content elements further includes:
    adjusting text size, position, and formatting dynamically in the generated images and descriptions for user convenience readability.

10. The method of claim 1, further comprising:
    A/B testing of the generated listing content to select the version that performs best in terms of conversion and sales before finalizing and storing the content for e-commerce display.

11. The method of claim 1, further comprising:
    displaying actionable recommendations for content optimization based on an analysis of the market data metrics, and user engagement feedback.

12. A system for automated content generation in e-commerce product listings, comprising:
    a memory storing instructions; and a processor configured to execute the instructions to:
    import listing data using Application Programming Interface (API) connections over a network;
    analyze the listing data to calculate a multimodal vector embedding;
    generate content elements for e-commerce display comprising product images, textual descriptions, and infographics based on the listing data, the multimodal vector embedding, and real-time market data metrics comprising click-through rates, time spent on listing pages, and conversion rates;
    apply a controlled generation algorithm through a text-to-image diffusion model to create the product images; and integrate loss-guidance and attention injection within the diffusion model to produce a controlled layout of the product images;
store the generated content elements in the data storage;
re-generate the content elements at predetermined intervals or in response to changes in the real-time market data metrics; and
wherein changes in the real-time market data metrics are determined based on a threshold value set for variations in market demand determined by product views and search volume, competitor pricing derived from real-time price comparisons, and consumer behaviour trends based on said click-through rates, time spent on pages, and conversion rates.

13. A non-transitory computer-readable storage medium storing instructions that, when executed by a processor, perform a method comprising:
   importing listing data using Application Programming Interface (API) connections over the network;
   analyzing the listing data to calculate a multimodal vector embedding;
   generating content elements for e-commerce display comprising product images, textual descriptions, and infographics based on the listing data, the multimodal vector embedding, and the real-time market data metrics comprising click-through rates, time spent on listing pages, and conversion rates;
wherein the generating comprises:
applying a controlled generation algorithm through a text-to-image diffusion model to create the product images; and
wherein the controlled generation algorithm integrates loss-guidance and attention injection within the diffusion model to produce a controlled layout of the product images; and
storing the generated content elements in the data storage;
re-generating the content elements at predetermined intervals or in response to changes in the real-time market data metrics; and
wherein changes in the real-time market data metrics are determined based on a threshold value set for variations in market demand determined by product views and search volume, competitor pricing derived from real-time price comparisons, and consumer behaviour trends based on said click-through rates, time spent on pages, and conversion rates.

\* \* \* \* \*